(12) United States Patent
Imaeda

(10) Patent No.: US 7,256,856 B2
(45) Date of Patent: Aug. 14, 2007

(54) ELECTRO-OPTICAL DEVICE, METHOD FOR MANUFACTURING ELECTRO-OPTICAL DEVICE, LIGHT GUIDE, LIQUID CRYSTAL DEVICE, METHOD FOR MANUFACTURING LIQUID CRYSTAL DEVICE, AND ELECTRONIC EQUIPMENT

(75) Inventor: Chiaki Imaeda, Suwa (JP)

(73) Assignee: Seiko Epson Corporation (JP)

( * ) Notice: Subject to any disclaimer, the term of this patent is extended or adjusted under 35 U.S.C. 154(b) by 191 days.

(21) Appl. No.: 09/879,804

(22) Filed: Jun. 12, 2001

(65) Prior Publication Data

US 2002/0015005 A1    Feb. 7, 2002

(30) Foreign Application Priority Data

Jun. 13, 2000  (JP) .............................. 2000-176965
May 24, 2001  (JP) .............................. 2001-155326

(51) Int. Cl.
*G02F 1/1343*  (2006.01)

(52) U.S. Cl. ........................................ 349/145; 349/61

(58) Field of Classification Search ........ 349/149–152, 349/58, 62, 65, 26, 31, 145
See application file for complete search history.

(56) References Cited

U.S. PATENT DOCUMENTS 5,629,786 A * 5/1997 Ogura et al. ................. 349/123
5,668,700 A * 9/1997 Tagusa et al. ............... 361/779
5,841,496 A * 11/1998 Itoh et al. .................... 349/113
5,923,393 A * 7/1999 Chang et al. ................ 349/151
6,025,644 A    2/2000 Imaeda
6,147,724 A * 11/2000 Yoshii et al. ................. 349/62
6,222,597 B1   4/2001 Muramatsu
6,552,771 B1 * 4/2003 Inoue et al. ................ 349/158

FOREIGN PATENT DOCUMENTS

| JP | 53-029098  | 3/1978  |
| JP | 57-139981  | 2/1981  |
| JP | 63-041125  | 3/1988  |
| JP | 63-41125   | 3/1988  |
| JP | 01-117394  | 5/1989  |
| JP | 01-123883  | 8/1989  |
| JP | 04-352131  | 12/1992 |
| JP | 05-333359  | 12/1993 |
| JP | 06-55135   | 7/1994  |

(Continued)

OTHER PUBLICATIONS

Communication from Japanese Patent Office.

(Continued)

*Primary Examiner*—David Nelms
*Assistant Examiner*—David Y. Chung
(74) *Attorney, Agent, or Firm*—Harness, Dickey & Pierce, P.L.C.

(57) ABSTRACT

A liquid crystal device 100 comprises a liquid crystal panel 110 and a holding member 120. A liquid crystal driving IC 115 and chip part 116 are mounted on a substrate extension portion 111T of the liquid crystal panel 110. The holding member 120 comprises, on an extension facing portion 122, a storing recess 122a for storing the liquid crystal driving IC 115, and a storing recess 122b for storing the chip part 116.

17 Claims, 21 Drawing Sheets

FOREIGN PATENT DOCUMENTS

| | | |
|---|---|---|
| JP | 08-292443 | 11/1996 |
| JP | 09-318968 | 12/1997 |
| JP | 10-206831 | 7/1998 |
| JP | 11-242237 | 9/1999 |
| JP | 2000-019493 | 1/2000 |
| JP | 2000-066178 | 3/2000 |
| JP | 2000-075273 | 3/2000 |
| JP | 2000-267591 | 9/2000 |
| JP | 2002-006313 | 1/2002 |

OTHER PUBLICATIONS

Communication from Japan Patent Office regarding counterpart application.

Communication from Japanese Patent Office regarding counterpart application.

* cited by examiner (a)

(b)

(c)

(a)

(b)

(c)

ELECTRO-OPTICAL DEVICE, METHOD FOR MANUFACTURING ELECTRO-OPTICAL DEVICE, LIGHT GUIDE, LIQUID CRYSTAL DEVICE, METHOD FOR MANUFACTURING LIQUID CRYSTAL DEVICE, AND ELECTRONIC EQUIPMENT

BACKGROUND OF THE INVENTION

1. Technical Field of the Invention

The present invention relates to an electro-optical device, a method for manufacturing the electro-optical device, a light guide, a liquid crystal device, a method for manufacturing the liquid crystal device, and electronic equipment, and particularly relates to an assembly structure between an electro-optical panel substrate and a holding member or circuit board disposed along the electro-optical panel substrate.

2. Description of the Related Art

Generally, with various types of electro-optical devices such as liquid crystal devices, electroluminescence devices, organic electroluminescence devices, plasma display devices, and so forth, there are cases wherein electronic parts such as driving ICs and the like are mounted on electro-optical panel substrates made up of glass or the like.

For example, liquid crystal devices generally have a pair of liquid crystal substrates with electrodes formed on the inner faces thereof and liquid crystal sandwiched therebetween, wherein the orientation state of the liquid crystal thereof is controlled by controlling the voltage applied to the liquid crystal, thereby modulating incident light to the liquid crystal. With this liquid crystal device, generally liquid crystal driving ICs are used for controlling the voltage applied to the liquid crystal, but there are cases wherein the liquid crystal driving ICs are directly mounted on the liquid crystal substrates, and cases wherein the liquid crystal driving ICs are mounted indirectly by mounting structures (flexible line boards, circuit boards, etc.) connected to the liquid crystal substrate.

Also, the liquid crystal panel itself has only a light modulating function, so separate illuminating means is necessary for allowing the display to be visually recognized as a liquid crystal device. An example of such illuminating means is a back-light for example, and this back-light includes members such as a light guide positioned behind the liquid crystal panel along the liquid crystal substrate.

However, in recent years, there is the need to advance reduction in size and reduction in weight of liquid crystal devices even further in order to meet the demands for reduction in thickness and reduction in weight and so forth regarding electronic equipment, so there is the need to reduce the thickness and reduce the weight of the overall liquid crystal device including the illuminating means such as the back-light and so forth, and there is the need to aim for securing space within the electronic equipment.

The present invention has been made in order to solve the above problems, and accordingly it is an object thereof to provide a structure for electro-optical equipment whereby reduction in thickness and reduction in weight can be realized, a structure of a light guide, and electronic equipment having these. Also, it is an object thereof to provide a manufacturing method whereby reduction in thickness and reduction in weight of electro-optical devices can be realized.

SUMMARY OF THE INVENTION

The electro-optical device according to a first invention for solving the above problems comprises: an electro-optical panel substrate; an electronic part mounted on the electro-optical panel substrate; and a holding member disposed along the electro-optical panel substrate so as to cover the electro-optical panel substrate; wherein the electronic part is positioned so as to protrude from the electro-optical panel substrate; and wherein the holding member is provided with a storing portion for storing the electronic part.

According to this invention, in the state that electronic part is stored in the storing portion of the holding member, the holding member is positioned along the electro-optical panel substrate, so the electro-optical device can be made thinner while securing the thickness of the holding member, and accordingly the size and weight can be reduced without sacrificing the functions or rigidity of the electro-optical device. Also, assembling by matching the electronic part to the storing portion facilitates positioning of the electro-optical panel substrate and the holding member, and accordingly assembly can be performed in a sure and speedy manner.

Now, various chip parts such as a liquid crystal driving IC, conductor, inductor, resistor, etc., or light-emitting elements such as LEDs may be contained for the electronic part, and any of these may serve.

Also, a space capable of accommodating the electronic part is sufficient for the storing portion, and may be any of a recess, groove, opening, notch, or the like.

With the present invention, the holding member is suitably configured so as to function as a light guide.

With the present invention, the holding member preferably comprises a light source storing portion for storing a light source.

With the present invention, areas surrounding the mounting area of the electronic part on the electro-optical panel substrate are preferably covered with a protective material having a flat face.

Also, the electro-optical device according to a second invention comprises: an electro-optical panel substrate; an electronic part mounted on the electro-optical panel substrate; and a holding member disposed along the electro-optical panel substrate so as to cover the electro-optical panel substrate; wherein the electro-optical panel substrate is covered with a protective material having a flat face; and wherein the electronic part is positioned so as to protrude from the protective material on the electro-optical panel substrate; and wherein the holding member is provided with a storing portion for storing the electronic part.

According to this invention, the electro-optical panel substrate where the electronic part is mounted is covered with a protective material having a flat face, so configurations for preventing contact between the protective material and the holding member do not readily interfere with reduction in the thickness of the electro-optical device. Also, even in the event that the holding member comes into contact with the surface of the protective material, the face of the protective material is formed flat, so there is no application of local stress from the holding member to the electro-optical panel substrate, thereby preventing damage to the electro-optical panel substrate, and also the electro-optical panel substrate can be supported over a wide area by the holding member.

With the present invention, the holding member is preferably configured so as to function as a light guide.

With the present invention, the holding member preferably comprises a light source storing portion for storing a light source.

Further, the electro-optical device according to a third invention comprises: an electro-optical panel substrate; an electronic part mounted on the electro-optical panel substrate; and a holding member disposed along the electro-optical panel substrate so as to cover the electro-optical panel substrate; wherein a plurality of the electronic parts are mounted on the electro-optical panel substrate; and wherein the plurality of electronic parts are positioned so as to protrude from the electro-optical panel substrate; and wherein the holding member is provided with a storing portion for storing the plurality of electronic parts.

With the present invention, the holding member is preferably configured so as to function as a light guide.

With the present invention, the holding member preferably comprises a light source storing portion for storing a light source.

With the present invention, a plurality of storing portions are preferably provided corresponding to the plurality of electronic parts.

With the present invention, the arrangement preferably comprises a plurality of the electronic parts having mutually different shapes or dimensions, and comprising a plurality of the storing portions configured with mutually different shapes or dimensions so as to match the forms of the corresponding electronic parts. According to this means, even in the event that multiple storing portions are formed, the storing portions have shapes or dimensions corresponding to the shapes or dimensions of the multiple electronic parts, so the assembly attitude of the electro-optical panel substrate and the holding member can be determined without hesitation.

With the present invention, the storing portion is preferably configured so as to store the plurality of electronic parts together. According to this means, even in the event that multiple electronic parts are formed on the electro-optical panel substrate, and even in the event that these have different shapes and dimensions, the structure of the holding member can be made simple.

With the present invention, the storing portion is preferably formed in the shape of a groove. Groove-shaped storing portions can be readily formed.

Also, the electro-optical device according to a fourth invention comprises: an electro-optical panel substrate; an electronic part mounted on the electro-optical panel substrate; and a holding member disposed along the electro-optical panel substrate so as to cover the electro-optical panel substrate; wherein the electronic part is positioned so as to protrude from the electro-optical panel substrate; and wherein the holding member is provided with an abutting portion which abuts the electro-optical panel substrate for positioning, and a storing portion for storing the electronic part in a state wherein the electro-optical panel substrate is positioned by the abutting portion.

According to this invention, the configuration is such that positioning the holding member by abutting the abutting portion against the electro-optical panel substrate causes the electronic part mounted on the electro-optical panel substrate to be stored within the storing portion of the holding member, so assembly work can be facilitated. Here, in the event that multiple electro-optical panel substrates are contained in the electro-optical device, the electro-optical panel substrate which abuts the abutting portion and the electro-optical panel substrate upon which the electronic parts are mounted may be the same or different articles.

With the present invention, the holding member is preferably configured so as to function as a light guide.

With the present invention, the holding member preferably comprises a light source storing portion for storing a light source.

With the present invention, the holding member preferably comprises an elastic holding portion for holding the electro-optical panel substrate in a state abutted against the abutting portion.

With the present invention, the holding member is preferably provided with a recessed structure for storing the electro-optical panel substrate, containing the abutting portion.

Further, the electro-optical device according to a fifth invention comprises: an electro-optical panel substrate; an electronic part mounted on the electro-optical panel substrate; a holding member disposed along the electro-optical panel substrate so as to cover the electro-optical panel substrate, the holding member functioning as a light guide; and a circuit board positioned along the holding member; wherein the electronic part is positioned so as to protrude from the electro-optical panel substrate; and wherein a light source is mounted to the circuit board so as to protrude toward the side of the holding member; and wherein the holding member is provided with a storing portion for storing the electronic part, and a light source storing portion for storing the light source.

According to this invention, electronic parts mounted to the electro-optical panel substrate are stored in the storing portion of the holding member, and a light source mounted to the circuit board is stored in the light source storing portion, so the overall thickness of the electro-optical device can be further reduced.

With the above inventions, the light source storing portion is preferably configured so as to accommodate the light source from the opposite side of the electro-optical panel substrate as to the holding member.

With the present invention, there are cases wherein the light source storing portion is assembled in a state with the light source stored therein. The light source may be mounted to members other than the holding member, such as the electro-optical panel substrate or circuit board, but there are also cases of being attached within the light source storing portion of the holding member.

Also, the electro-optical device according to a sixth invention comprises: an electro-optical panel substrate; a first electronic part mounted on the electro-optical panel substrate; and a holding member disposed along the electro-optical panel substrate so as to cover the electro-optical panel substrate; wherein the electronic part is positioned so as to protrude from the electro-optical panel substrate; and wherein the holding member is provided with a storing portion for storing another electronic part at an area adjacent to the electronic part.

According to this invention, storing another electronic part in a storing portion formed to the holding member positions the electronic part on the electro-optical panel substrate adjacent thereto, so positioning of the member upon which is mounted the other electronic part is facilitated.

With the present invention, there are cases wherein the other electronic part is attached to the other storing portion.

Further, the electro-optical device according to a seventh invention comprises: an electro-optical panel substrate; an electronic part mounted on the electro-optical panel substrate; and a circuit board disposed along the electro-optical panel substrate so as to cover the electro-optical panel substrate; wherein the electronic part is positioned so as to protrude from the electro-optical panel substrate; and wherein another electronic part is mounted to the circuit board at an area adjacent to the electronic part.

According to this invention, diposing the circuit board along the electro-optical panel substrate naturally positions adjacent to each other the electronic part on the electro-optical panel substrate and the other electronic part on the circuit board, so positioning of the electro-optical panel substrate and the circuit board becomes easier.

With the present invention, a holding member is preferably positioned between the electro-optical panel substrate and the circuit board, the holding member comprising a storing portion for storing the electronic part and the other electronic part adjacent thereto.

With the present invention, the holding member preferably has a light-guiding function.

With the present invention, the other electronic part preferably is a light source.

With the present invention, one of the electronic part and the other electronic part is preferably positioned between a pair of the other.

According to these means, the configuration is such that one of the electronic parts is positioned between a pair of the other electronic parts, further facilitating positioning of the electro-optical panel substrate and the circuit board.

Also, the electro-optical device according to another invention comprises: an electro-optical panel substrate, an electro-optical panel driving IC mounted onto the electro-optical panel substrate; and a holding member disposed along the electro-optical panel substrate so as to cover the electro-optical panel substrate; wherein the electro-optical panel driving IC is positioned protruding from the electro-optical panel substrate, and the holding member has a recess for storing the electro-optical panel driving IC.

With the present invention, the holding member preferably functions as a light guide.

With the present invention, a chip part is preferably mounted to the electro-optical panel substrate, the chip part being positioned protruding from the electro-optical panel substrate, and a recess being formed on the holding member for storing the chip part.

With the present invention, the recess is preferably a groove provided in the holding member.

With the present invention, a light source is preferably provided at the holding member side at the recess.

Also, the electro-optical device according to yet another invention comprises: an electro-optical panel substrate, an electro-optical panel driving IC mounted onto the electro-optical panel substrate; and a holding member disposed along the electro-optical panel substrate so as to cover the electro-optical panel substrate; wherein the electro-optical panel driving IC is positioned protruding from the electro-optical panel substrate, and the holding member has a notch provided from the outside at an area where the electro-optical panel driving IC is not situated.

With the present invention, the holding member preferably functions as a light guide.

With the present invention, a light source is preferably stored in the notch.

Also, the electro-optical device according to yet another invention comprises: an electro-optical panel substrate, an electro-optical panel driving IC mounted onto the electro-optical panel substrate; and a holding member disposed along the electro-optical panel substrate so as to cover the electro-optical panel substrate; wherein the electro-optical panel driving IC is positioned protruding from the electro-optical panel substrate; and wherein the holding member has a hole provided at an area where the electro-optical panel driving IC is not situated.

Next, the method for manufacturing the electro-optical device according to the first invention comprises: a step for mounting an electronic part on an electro-optical panel substrate; and a step for disposing a holding member along the electro-optical panel substrate so as to cover the electro-optical panel substrate; wherein the holding member is provided beforehand with a storing portion for storing the electronic part, and wherein the holding member is positioned such that the storing portion accommodates the electronic part.

With the present invention, the storing portion preferably accommodates the electronic part in the state that an abutting portion of the holding member which abuts the electro-optical panel substrate for positioning is abutting the electro-optical panel substrate.

With the present invention, the electro-optical panel substrate is preferably covered with a protective material following mounting the electronic part on the electro-optical panel substrate.

With the present invention, the protective material in an unhardened state is preferably applied onto the electro-optical panel substrate, following which the protective material is subjected to smoothing processing for smoothing and subsequently hardened.

With the present invention, the smoothing processing is preferably performed by inclining the electro-optical panel substrate and causing the applied protective material to flow.

With the present invention, the applied protective material preferably is mechanically smoothed in the smoothing processing.

With the present invention, a sheet-shaped protective material is preferably positioned on the electro-optical panel substrate, following which the sheet-shaped protective material is either dissolved or softened, and following which the protective material is hardened.

With the present invention, the sheet-shaped protective material is preferably provided with an opening at the mounting area of the electronic part on the electro-optical panel substrate.

Also, the method for manufacturing the electro-optical device according to the second invention comprises: a step for mounting an electronic part on an electro-optical panel substrate; and a step for disposing a circuit board along the electro-optical panel substrate so as to cover the electro-optical panel substrate; wherein, another electronic part is mounted to an area adjacent to the electronic part on the circuit board, and the circuit board is disposed along the electro-optical panel substrate such that the electronic part and the other electronic part are positioned adjacent to each other.

With the present invention, a holding member provided with a storing portion for storing the electronic part and the other electronic part adjacent thereto is preferably disposed between the electro-optical panel substrate and the circuit board.

With the present invention, both the electronic part and the other electronic part are preferably mounted such that one electronic part is positioned between a pair of the other electronic part.

Next, the light guide according to the present invention is a light guide used in a state disposed so as to cover an electro-optical panel substrate; comprising a storing portion for storing an electronic part mounted on the electro-optical panel substrate and positioned so as to protrude from the electro-optical panel substrate.

With the present invention, the storing portion is preferably configured so as to be capable of storing the electronic part from at least either the front or rear side, and another storing portion is provided so as to be capable of storing a light source from the other, front or rear side.

With the present invention, the storing portion is preferably configured so as to be capable of storing the electronic part from at least either the front or rear side, and the other storing portion is arranged to be capable of storing the light source from the other side, front or rear.

With the present invention, the light guide preferably further comprises an abutting portion which abuts the electro-optical panel substrate for positioning.

With the present invention, the light guide preferably further comprises an elastic holding portion for holding the electro-optical panel substrate against the abutting portion in the abutted state.

With the present invention, the light guide preferably further comprises a recess structure containing the abutting portion, for storing the electro-optical panel substrate.

Also, another light guide is a light guide disposed along an electro-optical panel substrate upon which an electro-optical panel driving IC is mounted, wherein the electro-optical panel driving IC is attached to the electro-optical panel in a manner protruding therefrom, and a recess is formed in the holding member for storing the protruding electro-optical panel driving IC.

Further, a different light guide is a light guide disposed along an electro-optical panel substrate upon which an electro-optical panel driving IC is mounted, wherein the electro-optical panel driving IC is attached to the electro-optical panel in a manner protruding therefrom, and a notch is provided to the holding member from the outside at an area where the electro-optical panel driving IC is not situated.

Next, the liquid crystal device according to the present invention is an electro-optical device according to any of the above inventions, wherein liquid crystal is provided between a pair of liquid crystal panel substrates which are the electro-optical panel substrates.

Also, another liquid crystal device comprises: a pair of liquid crystal panel substrates with liquid crystal sandwiched therebetween; an electronic part mounted to a substrate extension portion on at least one of the pair of liquid crystal panel substrates which extends further outwards than the outer shape of other the liquid crystal panel substrate; and a holding member provided along the liquid crystal panel substrate for covering the liquid crystal panel substrate; wherein the electronic part is positioned so as to protrude from the substrate extension portion; and wherein the substrate extension portion is covered with a protective material having a smooth surface; and wherein the holding member is provided with a storing portion for storing the electronic part.

The method for manufacturing the liquid crystal device according to the present invention is a method for manufacturing the electro-optical device according to any of the above inventions, wherein liquid crystal is provided between a pair of liquid crystal panel substrates which are the electro-optical panel substrates.

Next, the electronic equipment according to the present invention comprises: the electro-optical device according to any of the above inventions, and control means for controlling the electro-optical device.

Also, the electronic equipment according to the present invention comprises: the liquid crystal device according to any of the above inventions, and control means for controlling the liquid crystal device.

DETAILED DESCRIPTION OF THE PREFERRED EMBODIMENTS

Next, the electro-optical device, the method for manufacturing the electro-optical device, the light guide, the liquid crystal device, the method for manufacturing the liquid crystal device, and the electronic equipment, according to the present invention, will be described in detail according to an embodiment with reference to the attached drawings.

Figure 1:
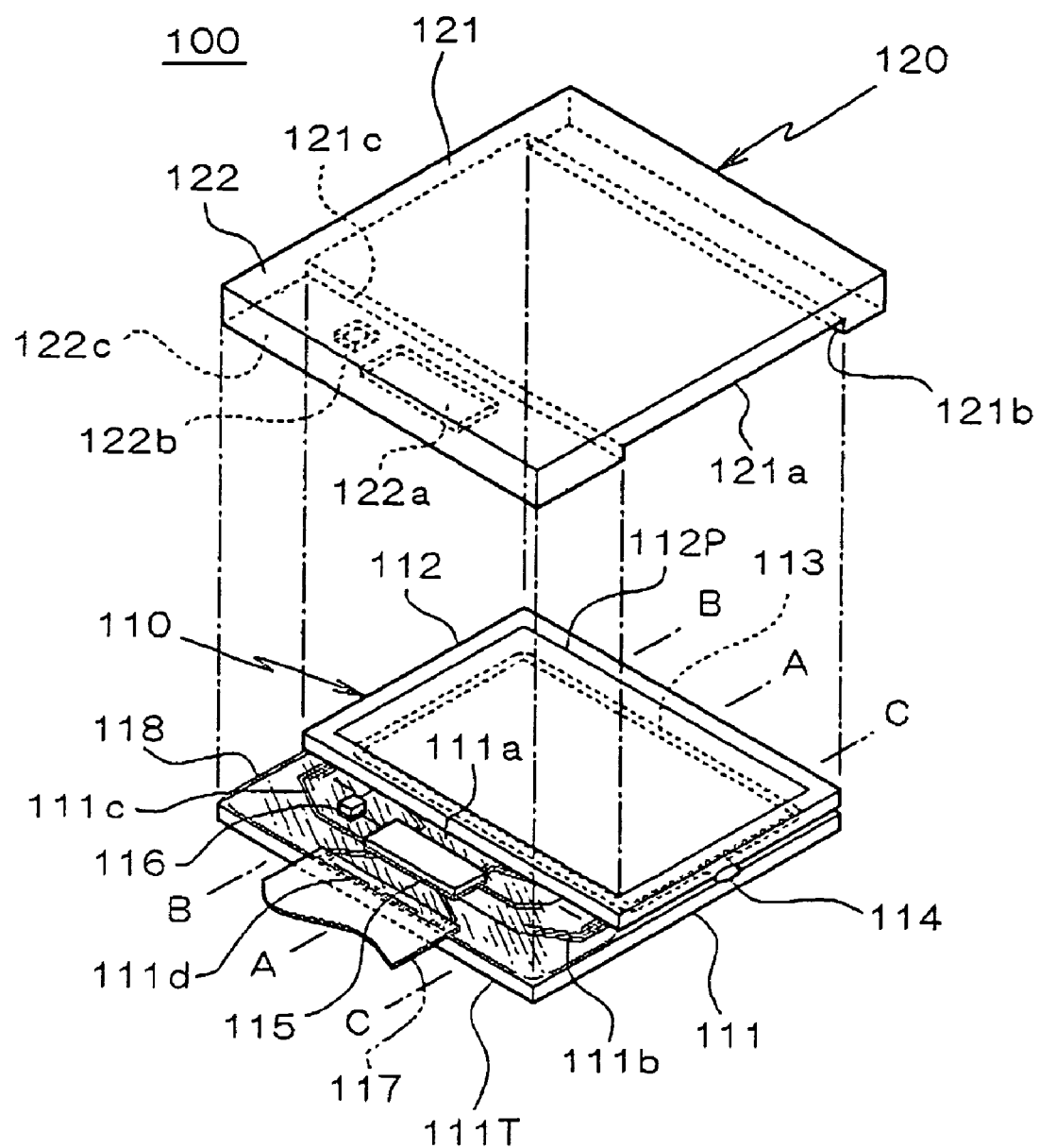
FIG. 1 is a disassembled perspective view illustrating the structure of a liquid crystal device according to a first embodiment of the present invention.
Figure 2:
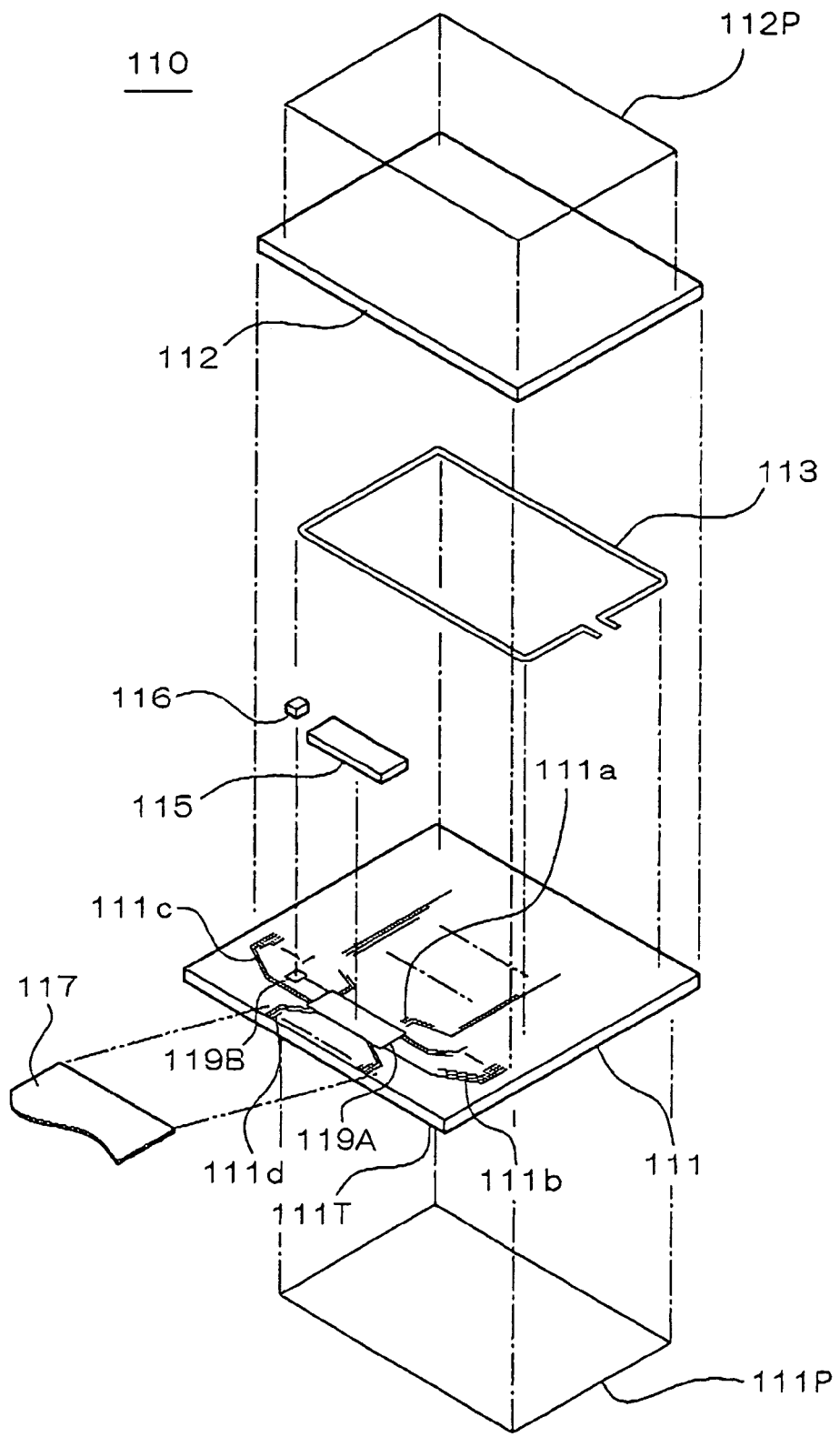
FIG. 2 is a disassembled perspective view illustrating the structure of a liquid crystal panel making up the liquid crystal device according to the first embodiment.
Figure 3:
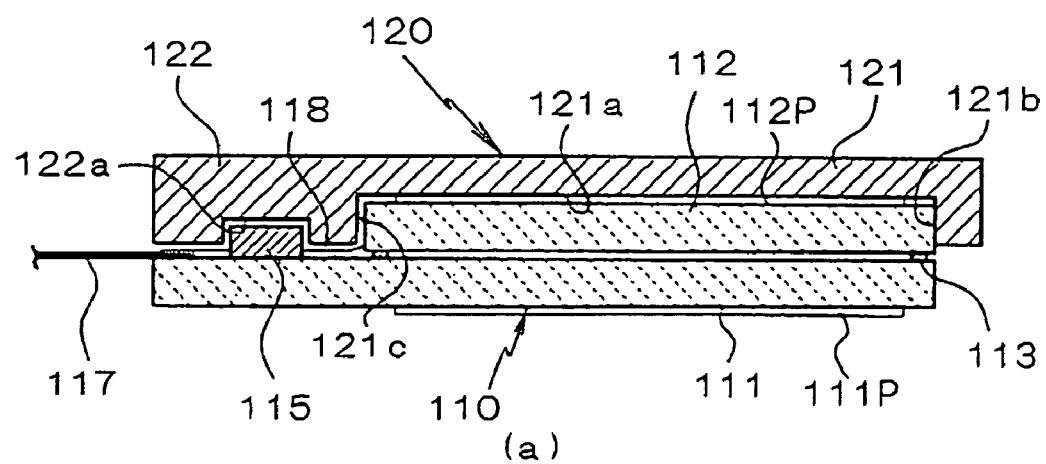
FIG. 3 is a longitudinal-sectional view (a) showing, with regard to the liquid crystal device according to the first embodiment, a longitudinal-section along line A—A in FIG. 1, a longitudinal-sectional view (b) showing a cross-section along line B—B in FIG. 1, and a longitudinal-sectional view (c) showing a cross-section along line C—C in FIG. 1.
Figure 3:
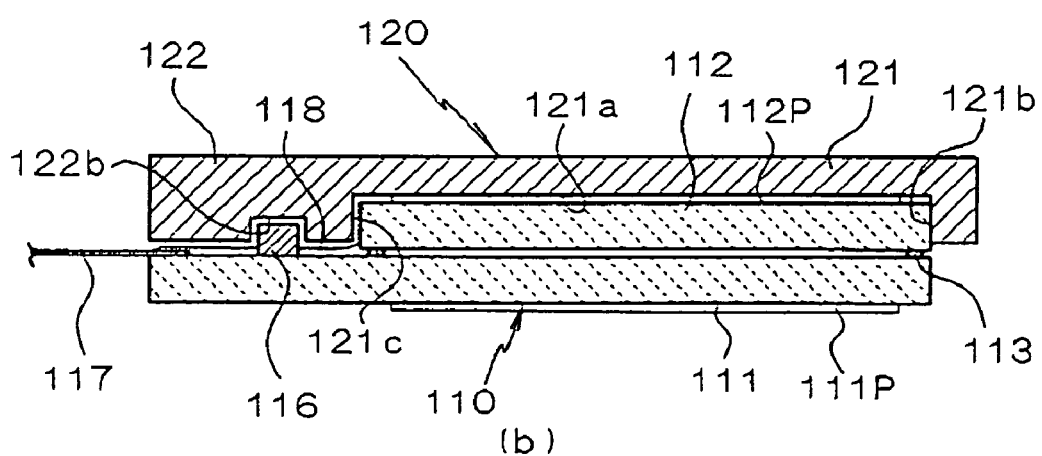
Figure 3:
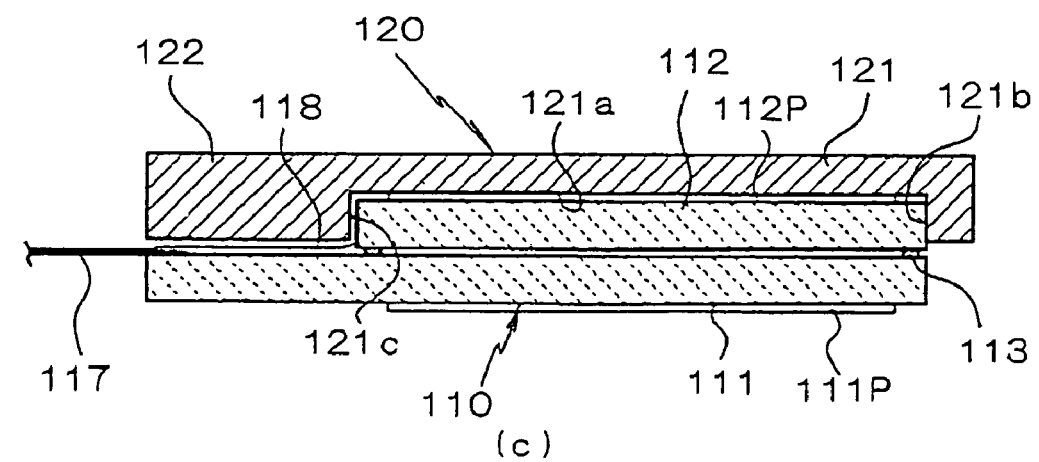

FIG. 1 is a disassembled perspective view of the structure of a liquid crystal device 100 according to the present invention, FIG. 2 is a disassembled perspective view illustrating the structure of a liquid crystal panel 110 making up part of the liquid crystal device 100, and FIG. 3 is a cross-sectional view showing a cross-section along line A—A in FIG. 1(a), a cross-section along line B—B in FIG. 1(b), and a cross-section along line C—C in FIG. 1(c).

The liquid crystal device 100 has a liquid crystal panel 110 with a later-described structure, and a holding member 120 formed of synthetic resin or the like. The liquid crystal panel 110 and the holding member 120 are attached as appropriate using, for example, adhesive tape (two-faced tape) not shown in the drawings, adhesive agent, an engaging structure, or the like.

The liquid crystal panel 110 is formed by sealing a first substrate 111 and a second substrate 112 formed of glass, plastic, etc., with a sealing material introduced therebetween, and injecting liquid crystal not shown in the drawings from an opening in the sealing material 113 following which the opening is sealed off with sealing material 114. The sealing material 113 is formed on the inner face of the first substrate 111 or second substrate 112 using printing technology such as screen printing for example. The first substrate 111 and second substrate 112 have a predetermined gap (e.g., 5 to 10 µm) stipulated therebetween, by spacers placed between the substrates or within the sealing material 113.

Multiple parallel electrodes formed so as to extend in a predetermined direction are formed in a stripe-like manner on the inner face of the first substrate 111 (the face facing the second substrate 112), and multiple parallel electrodes formed so as to extend in a direction orthogonal to that of the electrodes of the above first substrate 111 are formed in a stripe-like manner on the inner face of the second substrate 112 (the face facing the first substrate 111). The intersections of the electrodes form pixels, and the pixels are arrayed vertically and horizontally in a matrix so as to make up the liquid crystal driving area.

A rectangular substrate extension portion 111T is provided on the first substrate 111 extending outwards from the outer shape of the second substrate 112, and wiring patterns 111a, 111b, and 111c electroconductively connected to unshown electrode patterns formed on the first substrate 111 and second substrate 112 on the inner side of the sealing material 113 are extended and formed onto the surface of the substrate extension portion 111T.

An input wiring pattern 111d is formed on the surface of the substrate extension portion 111T separately from the wiring patterns 111a, 111b, and 111c, and a liquid crystal driving IC 115 comprising a semiconductor chip on which an integrated circuit has been formed and a surface mounting type chip part 116 formed of a surface-mounting type capacitor, inductor, resistor, etc., are mounted on the wiring patterns 111a, 111b, 111c, and input wiring pattern 111d, with anisotropic conductive films 119A and 119B shown in FIG. 2 introduced therebetween, thereby forming a so-called COG (Chip-On-Glass) liquid crystal device. The liquid crystal driving IC 115 and chip part 116 both correspond to the aforementioned electronic parts. The electronic parts also include later-described light-emitting elements configuring light sources such as LEDs (Light-Emitting Diodes) and LDs (Laser Diodes).

The anisotropic conductive films 119A and 119B are fabricated by dispersing fine electroconductive particles in a resin base material, and fix the liquid crystal driving IC 115 and chip part 116 onto the substrate in a state of having electroconductivity only in the thickness direction thereof, by performing thermocompression (subjected to heating processing in a compressed state) to the liquid crystal driving IC and chip part 116.

Also, mounted on the edge of the substrate extension portion 111T is a wiring member 117 formed of a flexible wiring board or a TAB (Tape Automated Bonding) substrate or the like, so as to be electroconductively connected to the aforementioned input wiring pattern 111d. This wiring member 117 is either mounted across the same type of anisotropic conductive film as that described above, or across an anisotropic conductive layer with approximately the same structure provided upon the wiring member 117 itself.

Note that the wiring member 117 may contain only a wiring pattern simply extended from external circuits, or there may be a predetermined circuit formed upon the wiring member 117 itself. In the case of the latter, an electronic part such as an integrated circuit chip, surface-mounted type circuit device, light-emitting element, etc., are normally mounted on the wiring member 117.

A mold material (protective material) 118 formed of a mold material of silicon resin or the like or a ultraviolet-light hardening mold material or the like covers the substrate surface of the substrate extension portion 111T. This mold material 118 protects the wiring patterns formed on the surface of the substrate extension portion 111T, and prevents corrosion and the like thereof. Conventionally, unhardened mold material is normally just coated on the substrate extension portion 111T and hardened, so as to cover the substrate extension portion 111T with different thickness at different parts, but with the present embodiment, the mold material 118 has an approximately uniform thickness on the substrate extension portion 111T, and is formed so as to have a smooth overall surface, due to a later-described method. Also, the above-described liquid crystal driving IC 115 and chip part 116 are in a state of protruding beyond the surface of the mold material 118.

At the liquid crystal panel 110, a polarizing plate 111P is applied to the outer surface of the first substrate 111, and a polarizing plate 112P is applied to the outer surface of the second substrate 112.

The protective member 120 is formed on an overall plate shape in the example shown in the figure, and comprises a panel supporting portion 121 which is overlaid with the liquid crystal driving area of the liquid crystal panel 100, and an extension facing portion 122 configured thickly so as to be overlaid with the substrate extension portion 111T. A recessed groove 121a for storing the second substrate 112 is formed on the panel supporting portion 121. The opposing inner faces 121b and 121c facing the recessed groove 121a are configured so as to opposingly face one another at the edge of the second substrate 112 from both sides, to restrict the second substrate 112 in the plane direction.

The extension facing portion 122 of the holding member 120 is formed so as to be overall thicker than the panel supporting portion 121, and is configured so as to loosely fit to the substrate extension portion 111T. Storing recesses 122a and 122b are provided to the extension facing portion 122 for storing the liquid crystal driving IC 115 and chip part 116. The plane surface of the extension facing portion 122 may be configured so as to face the mold material 118 on the substrate extension portion 111T with a slight gap introduced therebetween, or to come into planar contact with the mold material 118.

The holding member 120 functions as a panel frame (holding means for the liquid crystal panel) provided for holding the liquid crystal panel 110 and fixing it onto the circuit board or within the electronic equipment, but may also be arranged to function as a light guide of a back-light. In this case, the holding member 120 is formed of a transparent material such as transparent acrylic resin or the like. Also, a reflecting plate (white polyester film or the like) may be applied to the outer face of the holding member 120 opposite to the second substrate 112, or a reflecting layer may be formed by printing or the like. Forming minute recesses and protrusions on the outer face of the holding member 120 can also substitute as the reflecting layer. Further, the light source such as an LED or the like casing light into the light guide may be provided externally such as mounted on the circuit board, or may be directly attached to the liquid crystal panel 110 or holding material 120.

In the present embodiment, providing the holding member 120 with the storing recesses 122a and 122b for storing the liquid crystal driving IC 115 and chip part 116 stores the liquid crystal driving IC and chip part 116 protruding from the substrate extension portion 111T within the storing recesses 122a and 122b, so the overall thickness of the liquid crystal device 100 can be reduced while securing sufficient thickness for the holding member 120 (the thickness in the vertical direction in FIG. 1 through FIG. 3). Also, the overall volume of the liquid crystal device 100 can be reduced, so weight can be reduced as well.

Also, due to the storing recesses 122a and 122b provided to the holding member 120, the liquid crystal panel 110 and the holding member 120 can be assembled by matching the liquid crystal driving IC 115 and chip part 116 to the storing recesses 122a and 122b, which facilitates positioning of the two and allows assembly to be performed in a sure and speedy manner, doing away with mistakes in the direction of assembly of the liquid crystal panel 110 and the holding member 120 and so forth. Particularly, the liquid crystal driving IC 115 and chip part 116 have different shapes and dimensions, and the storing recesses 122a and 122b are formed so as to have shapes and dimensions matching the shapes and dimensions thereof (i.e., the liquid crystal driving IC 115 has a large flat shape, and the chip part 116 has a small flat shape, so the planar form of the storing recess 122a is large, and the planar form of the storing recess 122b is small), so mistakes at the time of assembly can be further reduced, allowing assembly to be performed in a sure and speedy manner.

With the present embodiment, a recessed groove 121a for accommodating the second substrate 112 is provided on the holding member 120, so assembly can be performed by matching the liquid crystal panel 120 to the recessed groove 121a further facilitating the assembly work. As shown in FIG. 3, the opposing inner faces 121b and 121c of the recessed groove 121a are configured so as to come into contact with the edge of the second substrate 112, such that with the example shown in the figure for example, the inner face 121b can be used as an abutting face, which is abutted against the edge face of the second substrate 112, to perform positioning.

With the present embodiment, mold material 118 on the substrate extension portion 111T being formed smooth means that assembly can be performed in a state with the inner faces of the extension facing portion 122 of the holding member 120 being even closer to the substrate extension portion 111T, thereby enabling the overall thickness of the liquid crystal device 100 to be reduced even further.

Now, the mold material 118 is preferably colored. This is because, in the event that the mold material 118 is transparent, whether or not the mold material is covering the substrate extension portion 111T is not so readily discernible. The mold material 118 is preferably colored white. This is because this facilitates discovery of impurities or foreign material in the mold material 118 or adhering to the surface thereof, and such impurities or foreign material cannot be readily discovered in the event that the color is black, for example.

Also, mixing filler for coloring into the holding member 120 facilitates positioning at the time of assembling the liquid crystal panel 110 and the holding member 120, and also facilitates discovery of inclusion of foreign matter or the like into the liquid crystal device 100. Now, in the event of using the holding member 120 as a light guide, this coloring preferably is performed to an extent that there are no adverse effects on the light guiding capabilities.

Also, with the above embodiment, the substrate extension portion 111T is covered by the mold material 118, but the mold material 118 is not indispensable.

While the present embodiment has polarizing plates respectively disposed on the outer faces of the first substrate and second substrate, there are cases wherein polarizing plates are not necessary depending on the liquid crystal mode, and in such cases, there is no need to provide the polarizing plates. Also, there are also cases wherein a polarizing plate is positioned only on the observing side, and cases wherein phase difference plates or the like are provided in addition to the polarizing plates, so in such cases, the configuration will correspond to the case. The above information holds exactly the same for all of the liquid crystal devices described below, and accordingly, no mention will be made of the polarizing plates in the following description and the polarizing plates will be omitted from the drawings.

Figure 4:
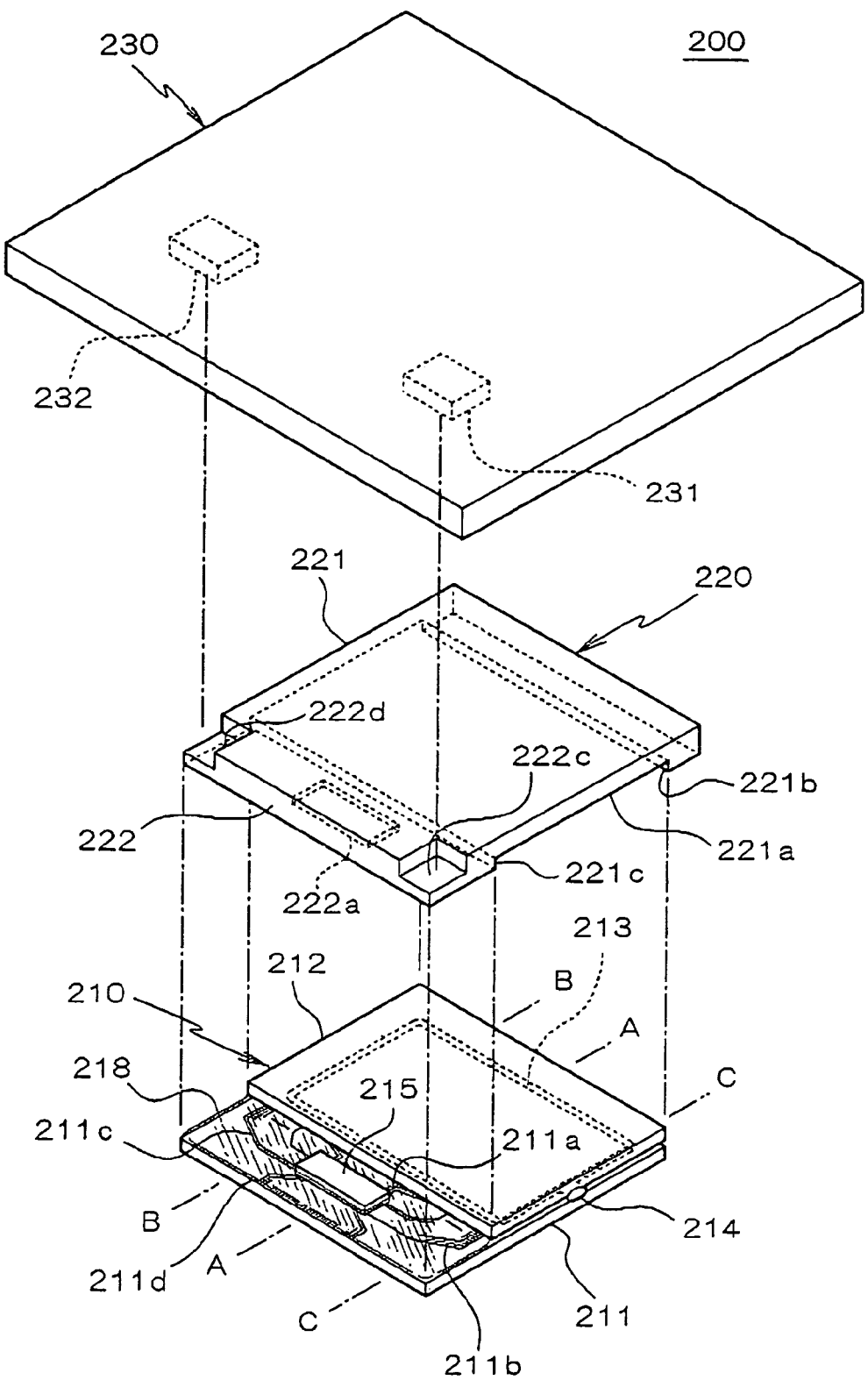
FIG. 4 is a disassembled perspective view of the structure of the liquid crystal device 200 according to the second embodiment of the present invention.
Figure 5:
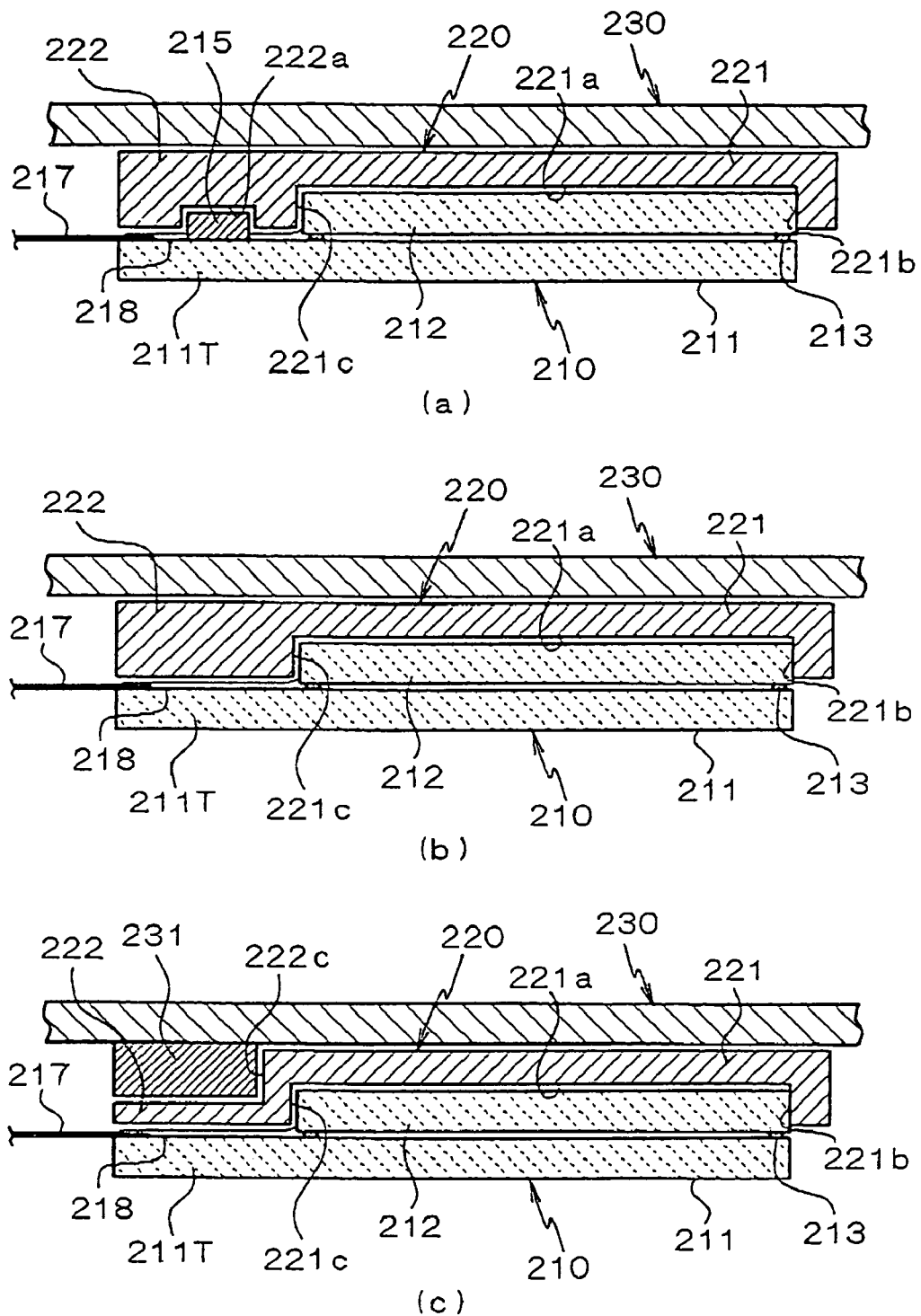
FIG. 5 is a longitudinal-sectional view (a) showing, with regard to the liquid crystal device according to the first embodiment, a longitudinal-section along line A—A in FIG. 4, a longitudinal-sectional view (b) showing a cross-section along line B—B in FIG. 4, and a longitudinal-sectional view (c) showing a cross-section along line C—C in FIG. 4.

The liquid crystal device 200 according to a second embodiment of the present invention will be described with reference to FIG. 4 and FIG. 5. FIG. 4 is a disassembled perspective view of the liquid crystal device 200, and FIG. 5 is a longitudinal-sectional view (a) showing a cross-section along line A—A in FIG. 4, a longitudinal-sectional view (b) showing a cross-section along line B—B in FIG. 4, and a longitudinal-sectional view (c) showing a cross-section along line C—C in FIG. 4.

With the liquid crystal device 200 according to this embodiment, the first substrate 211 and second substrate 212 of the liquid crystal panel 210, the seal material 213, the sealing material 214, liquid crystal driving IC 215, wiring member 217 (omitted in FIG. 4, see FIG. 5) and mold material 218, panel supporting portion 221 of the holding member 220, recessed groove 221a, inner faces 221b and 221c, and storing recesses 222a and 222b of the extension facing portion 222, are exactly the same as those in the above first embodiment, so description thereof will be omitted.

With the present embodiment, only the liquid crystal driving IC 215 is mounted on the substrate extension portion 211T of the liquid crystal panel 210. The wiring patterns 211a, 211b, 211c, and input wiring pattern 211d provided to the on the substrate extension portion 211T are exactly the same as those in the first embodiment, and all of these patterns are electroconductively connected to the liquid crystal driving IC 215. Also, a storing recess 222a alone is formed to the lower face of the holding member 220 in the diagram so as to store the liquid crystal driving IC 215.

Notched storing recesses 222c and 222d are formed to the extension facing portion 222 of the holding member 220 on the opposite side to the liquid crystal panel 210 at the corners of the plate. These storing recesses 222c and 222d are configured to be positioned above both right and left sides of the liquid crystal driving IC 215 on the substrate extension portion 211T when the holding member 220 is assembled so as to cover the liquid crystal panel 210.

A circuit board 230 is positioned above the holding member 220. The circuit board 230 may be a thick printed circuit board (PCB) with a base of glass epoxy resin or the like, for example, or may be a flexible circuit board (FPC) with a base of polyimide resin or the like. A pair of light-emitting elements 231 and 232 such as LEDs or the like is mounted on the lower face of the circuit board 230 in the figure. The light-emitting elements 231 and 232 are configured so as to be lit based on power source potential and control signals supplied from a circuit formed on the circuit board 230.

The pair of light-emitting elements 231 and 232 such as LEDs or the like mounted on the circuit board 230 are configured so as to be stored in the storing recesses 222c and 222d of the holding member 220 when the holding member 220 and circuit board 230 are assembled in a layered manner, as shown in FIG. 5(c). Light emitted from the light-emitting elements 231 and 232 is guided into the holding member 220 serving as a light guide, via the inner faces of the storing recesses 222c and 222d of the holding member 220. The light led into the holding member 220 is cast onto the liquid crystal panel 210 using a known light guiding structure (not shown, but may be, for example, a printed layer, reflecting layer reflecting palate or a like reflection arrangement, scattering by a roughened structure, total reflection off of an inclined face, and so forth).

With this liquid crystal device 200, the holding member 220 is positioned above the liquid crystal panel 210, and further the circuit board 230 is positioned above the holding member 220. At this time, the recessed groove 221a of the holding member 220 is positioned so as to accommodate the second substrate 212 of the liquid crystal panel 210, and the storing recess 222a of the holding member 220 stores the liquid crystal driving IC 215 protruding from the substrate extension portion 211T. Also, the circuit board 230 is positioned above the holding member 220 such that the light-emitting elements 231 and 232 of the circuit board 230 are accommodated within the storing recesses 222c and 222d of the holding member 220 as described above. Incidentally, the liquid crystal panel 210, the holding member 220, and the circuit board 230, preferably are mutually fixed by adhesive tape not shown in the drawings, adhesive agent, an engaging structure, or the like.

With the present embodiment, in addition to the advantages described with the first embodiment, the light-emitting elements 231 and 232 mounted on the circuit board 230 are accommodated within the storing recesses 222c and 222d of the holding member 220, thereby yielding the advantage that the overall thickness of the liquid crystal device 200 comprising the liquid crystal panel 210, the holding member 220, and the circuit board 230, can be further reduced. Also, the corresponding structure of the light-emitting elements 231 and 232 and the corresponding storing recesses 222c and 222d facilitates positioning of the holding member 220 and the circuit board 230, thereby facilitating assembly.

Figure 6:
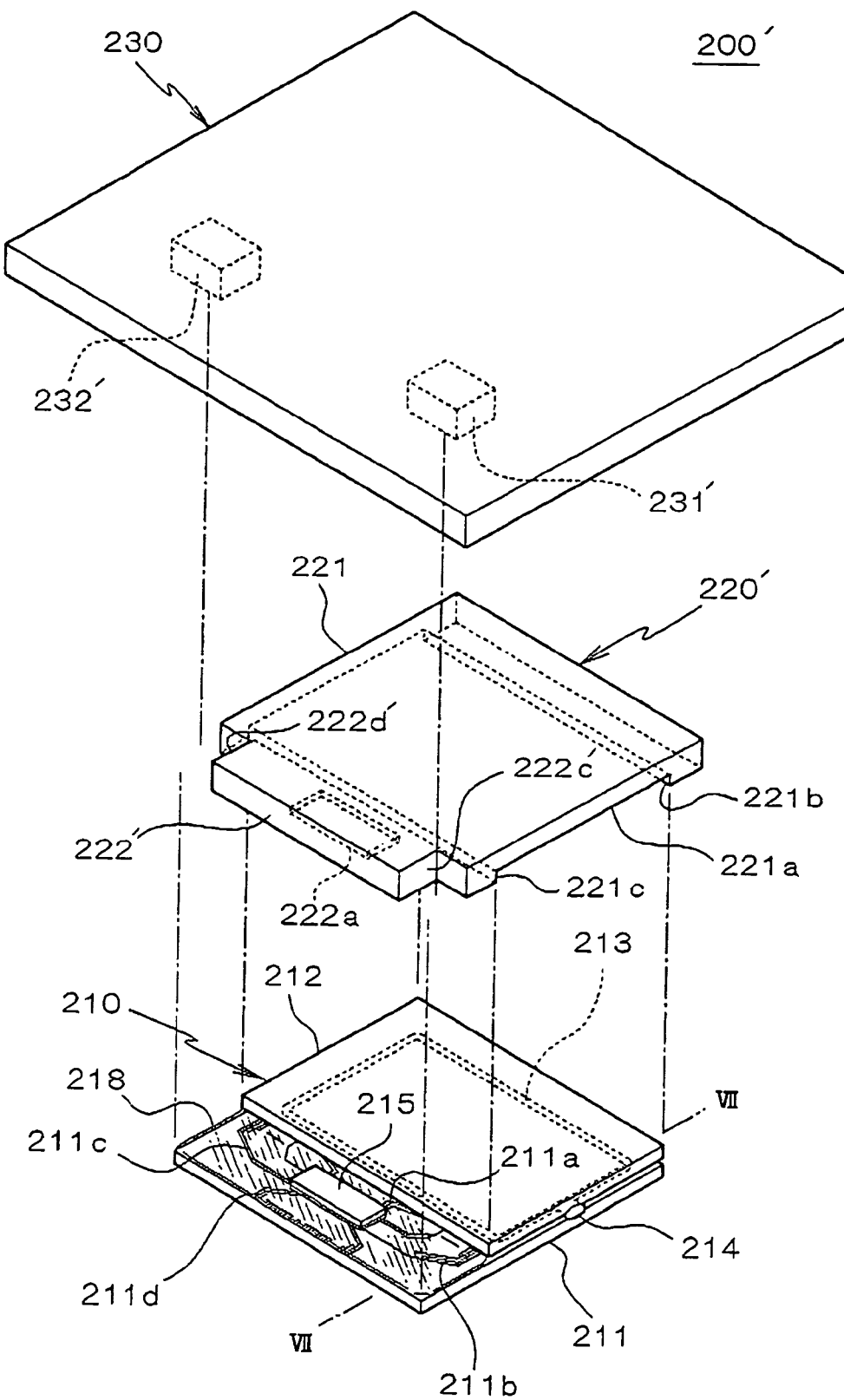
FIG. 6 is a disassembled perspective view of the structure of a liquid crystal device according to a variation of the second embodiment.
Figure 7:
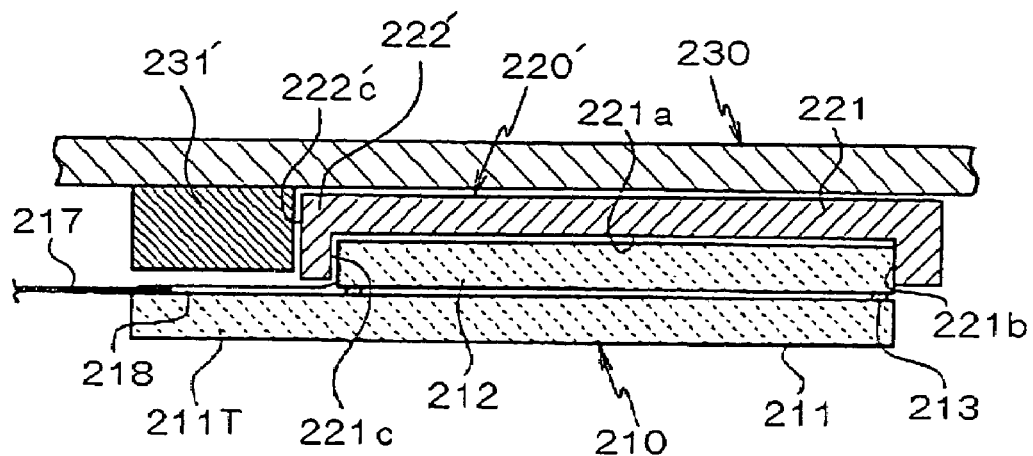
FIG. 7 is a longitudinal-sectional view illustrating the cross-section along line VII—VII in FIG. 6.

With this second embodiment, the form of the storing recesses 222c and 222d formed in the holding member 220 can be selected as appropriate. For example, with the above example these are formed as notched recesses, but may be formed as notched openings as shown in FIG. 6 and FIG. 7. Now, FIG. 6 is a disassembled perspective view of the structure of a liquid crystal device 200' which is a variation of the present embodiment, and FIG. 7 is a cross-sectional view illustrating the cross-section along line VII—VII in FIG. 6. In this variation, the reference numerals used for denoting the same parts are the same as in the second embodiment, and description thereof will be omitted.

With the liquid crystal device 200' which is a variation, notched opening storing recesses 222c' and 222d' are formed at the left and right corner portions of the extension facing portion 222' of the holding member 220'. The configuration is such that when the circuit board 230 is positioned in the proper position above the holding member 220', the light-emitting elements 231' and 232' mounted on the circuit board 230 are accommodated in the storing openings 222c' and 222d'.

With this variation, forming the storing openings 222c' and 222d' in the holding member 220' allows a storing space approximately equal to the thickness of the extension facing portion 222' of the holding member 220' to be obtained, so light-emitting elements 231' and 232' greater (or more specifically, thicker) than the light-emitting elements 231 and 232 in the second embodiment can be accommodated.

Figure 8:
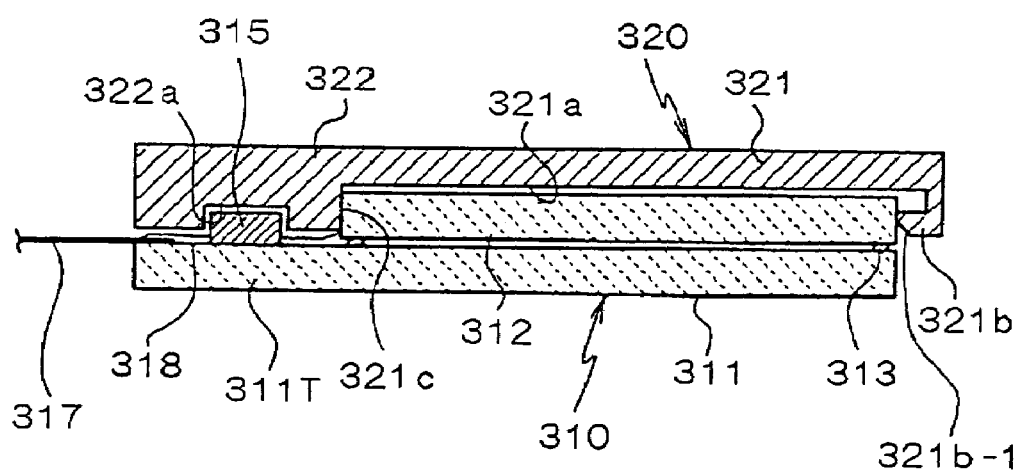
FIG. 8 is a longitudinal-sectional view illustrating the structure of the liquid crystal device according to a third embodiment of the present invention.

Next, the liquid crystal device 300 according to a third embodiment of the present invention will be described with reference to FIG. 8. The liquid crystal device 300 has a liquid crystal panel 310 and a holding member 320 covering the liquid crystal panel 310, as with the first embodiment or second embodiment. The first substrate 311, the second substrate 312, the sealing material 313, the liquid crystal driving IC 315, the wiring member 317, and the mold material 318 are the same as those in the above embodiments, so description thereof will be omitted.

The holding member 320 has a panel supporting unit 321 comprising a recessed grove 321a and a thick extension facing portion 322. A storing recess 322a is formed on the extension facing portion 322 as with the above embodiments, and a liquid crystal driving IC 315 is stored within this storing recess 322a.

On the other hand, a storing recessed groove 321a the same as that of the above embodiments is provided to the panel supporting portion 321 of the holding member 320, but a hook-shaped elastic engaging portion 321b is provided to one side of the storing recessed groove 321a. Also, an inner face 321c the same as that of the above embodiments is formed on the other side of the storing recessed groove 321a.

With this embodiment, fitting the second substrate 312 of the liquid crystal panel 310 into the storing recessed groove 321a causes the elastic engaging portion 321b to abut against the edge of the second substrate 312 and to elastically press against the second substrate 312, so the other edge of the second substrate 312 is in a state of being pressed against the above inner face 321c. Note that an inclined portion or beveled portion (curved portion) 321b-1 is provided to the tip portion of the liquid crystal panel 310 side of the elastic engaging portion 321b, so as to facilitating fitting thereof to the second substrate 312.

According to this embodiment, an elastic engaging portion 312 is provided to the holding member 320 and also an inner face 321c which is an abutting face is formed at the other side, so the liquid crystal panel 310 can be positioned as to the holding member 320 in a planar manner, and also both can be held by the elasticity of the elastic engaging portion 321b. Accordingly, even easier assembly of the liquid crystal panel 310 and the holding member 320 can be facilitated. For example, in the example shown in the drawing, simply lightly fitting the holding member 320 to the liquid crystal panel 310 from above completes the assembly work. Of course, in this assembled state, the liquid crystal driving IC 315 protruding from the substrate extension portion 311T is stored within the storing recess 322a of the holding material 320.

Figure 9:
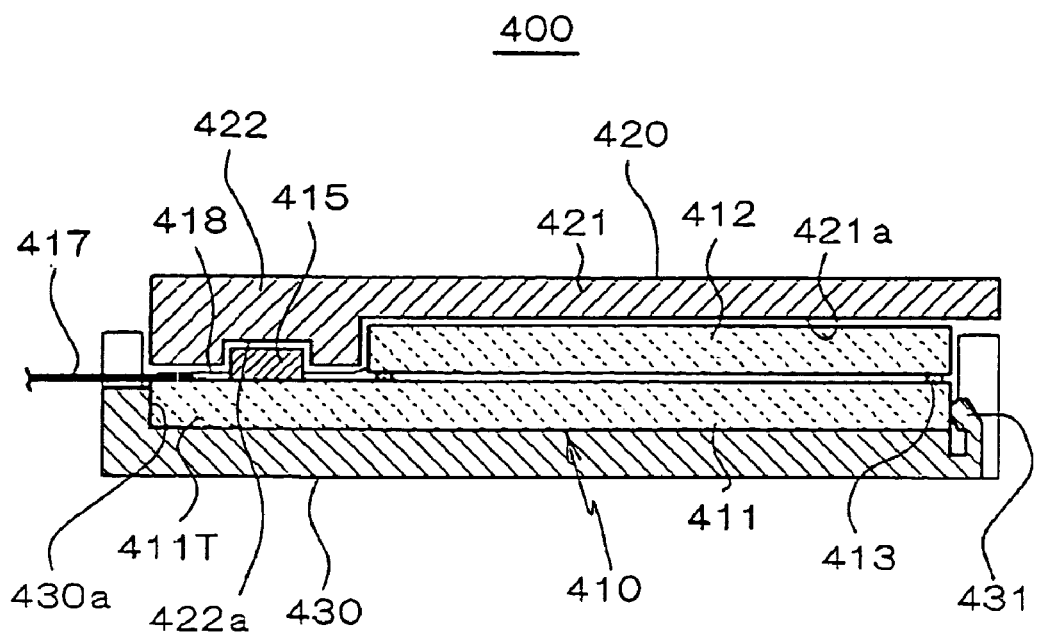
FIG. 9 is a longitudinal-sectional view illustrating the structure of the liquid crystal device according to a fourth embodiment of the present invention.
Figure 10:
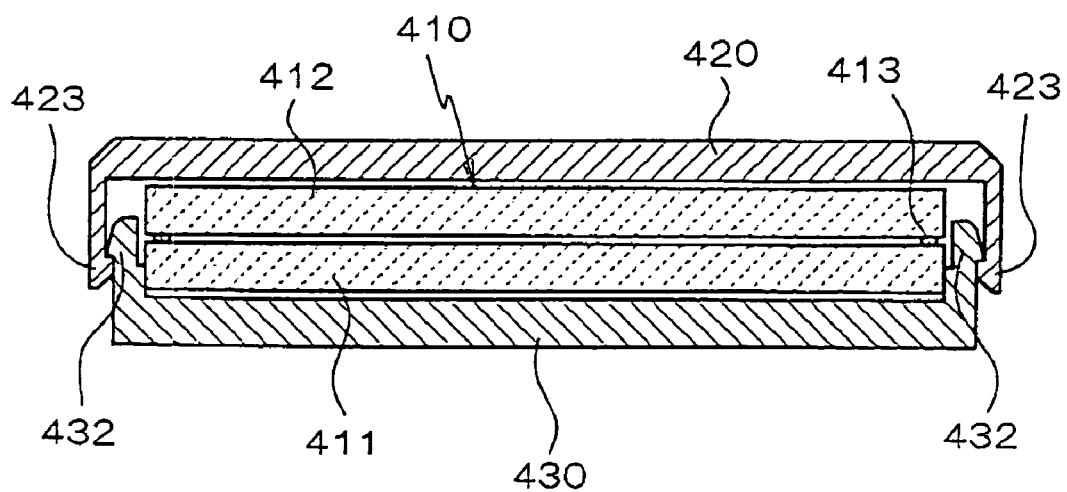
FIG. 10 is a longitudinal-sectional view illustrating the cross-section orthogonal to the cross-section shown in FIG. 9.

Next, the liquid crystal device 400 according to a fourth embodiment of the present invention will be described with reference to FIG. 9 and FIG. 10. FIG. 9 is a longitudinal-section view of the liquid crystal device 400, and FIG. 10 is a longitudinal-section view of a cross-section orthogonal to the cross-section shown in FIG. 9. The liquid crystal device 400 has a liquid crystal panel 410, a holding member 420 covering the liquid crystal panel 410, and a holding member 430 covering the liquid crystal panel 410 from the other side.

The liquid crystal panel 410 is formed by attaching the first substrate 411 to the second substrate 412 with the seal material 413 and sealing liquid crystal therewithin as with the above embodiments, and the liquid crystal driving IC 415 and wiring member 417 are mounted on the substrate extension portion 411T of the first substrate 411, with mold material 418 having a smooth surface covering the substrate extension portion 411T.

The panel supporting portion 421 and extension facing portion 422 are provided to the holding member 420, the extension facing portion 422 is formed as a thick portion facing the substrate extension portion 411T, and a storing recess 422a for storing the liquid crystal driving IC 415 protruding from the substrate extension portion 411T is provided here. A recessed grove 421a is provided on the holding member 420, so that the second substrate 412 of the liquid crystal panel 410 is accommodated in this recessed grove 421a.

On the other hand, the holding member 430 is configured so as to cover the overall first substrate 411, and as shown in FIG. 9, comprises an abutting portion 430a for abutting against the edge of the first substrate 411 (in the example in the figure, the edge of the substrate extension portion 411T) and an elastic engaging portion 431 for engaging the edge opposite to the edge where this abutting portion 430a abuts. This first substrate 411 is positioned and held in a manner pinched between the abutting portion 430a of the holding member 430 and the elastic engaging portion 431.

As shown in FIG. 10, the holding member 420 and the holding member 430 each have an engaging portion 423 and an engaging portion 432 which mutually engage at the side of the liquid crystal panel 410. The configuration is such that the engaging of the engaging portion 423 and the engaging portion 432 holds the holding member 420 and the holding member 430 together with the liquid crystal panel 410 held therebetween.

With the present embodiment, the first substrate 411 of the liquid crystal panel 410 is positioned and held by the holding member 430, and the holding member 420 is engaged and held with the holding member 430, whereby the recessed grove 421a of the holding member 420 stores the second substrate 412 of the liquid crystal panel 410, and moreover, the liquid crystal driving IC protruding from the substrate extension portion 411T is accommodated in the storing recess 422a of the holding member 420.

Accordingly, the overall thickness of the liquid crystal device 400 can be reduced, and easy assembly is facilitated. Here, one of the holding members 420 or 430 can be formed of a transparent material, to function as a window material (protective member of the display screen) of the liquid crystal panel 410. Also, as with the above embodiments, an arrangement may be made wherein the other of the holding members 420 and 430 functions as a light guide.

Figure 11:
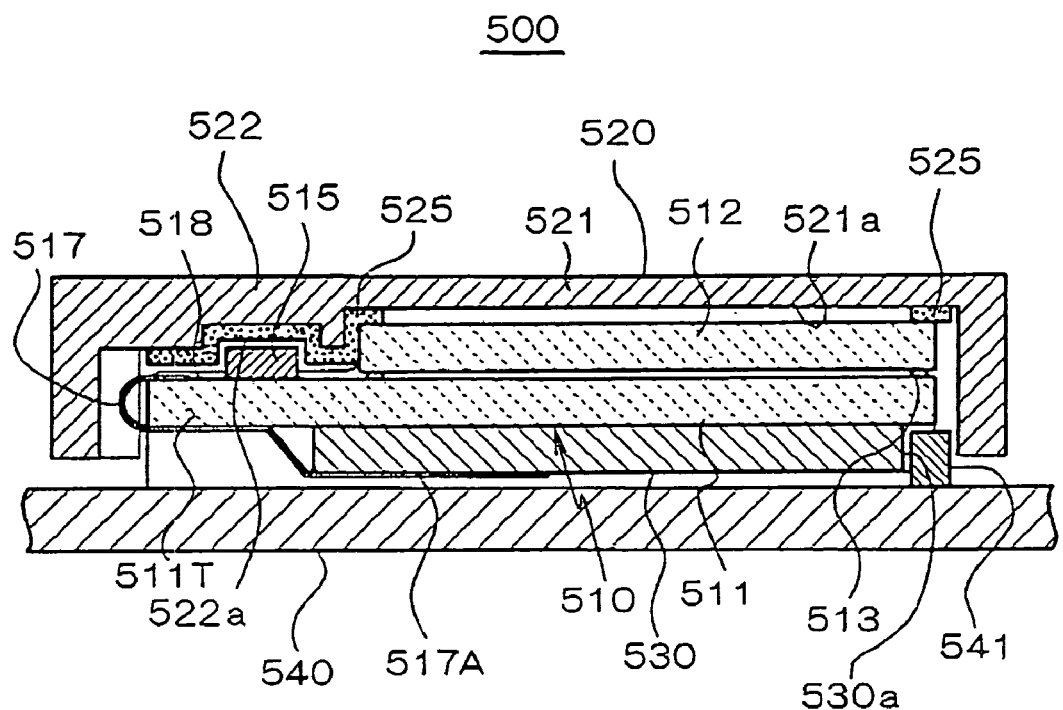
FIG. 11 is a longitudinal-sectional view illustrating the structure of the liquid crystal device according to a fifth embodiment of the present invention.
Figure 12:
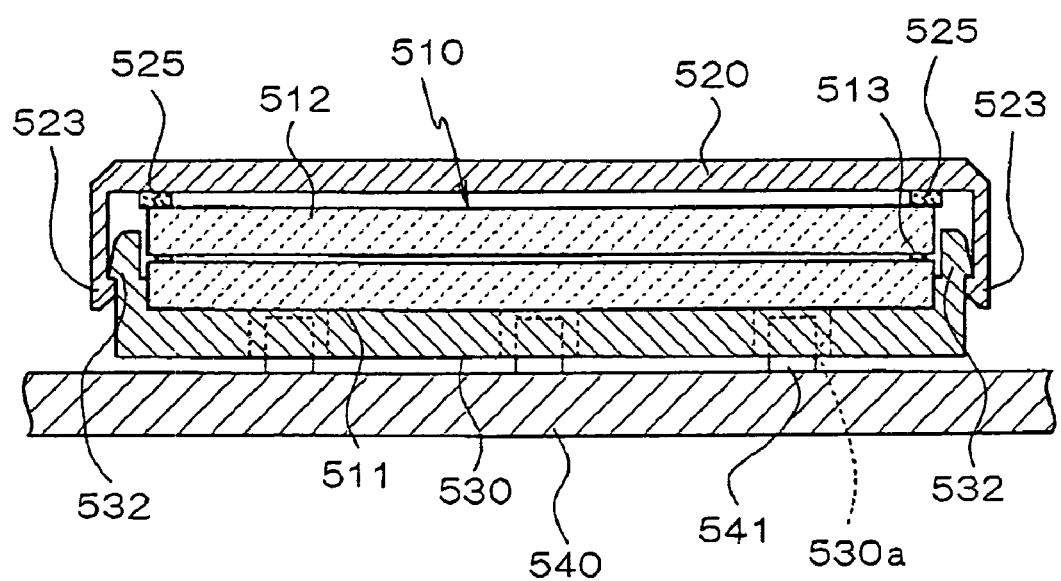
FIG. 12 is a longitudinal-sectional view illustrating the cross-section orthogonal to the cross-section shown in FIG. 11.

Next, the liquid crystal device 500 according to a fifth embodiment of the present invention will be described with reference to FIG. 11 and FIG. 12. FIG. 11 is a longitudinal-section view of the liquid crystal device 500, and FIG. 12 is a longitudinal-section view of a cross-section orthogonal to the cross-section shown in FIG. 11. The liquid crystal device 500 has a liquid crystal panel 510, and holding members 520 and 530.

Although details of the liquid crystal panel 510 will be omitted due to their being the same as in the above embodiments, the article is formed by attaching the first substrate 511 to the second substrate 512 with the seal material 513 and sealing liquid crystal therewithin. The liquid crystal driving IC 515 and wiring member 517 are mounted on the substrate extension portion 511T. The wiring member 517 passes around to the rear side of the liquid crystal panel 510 (the opposite side from the observation side), and comprises an external circuit portion 517A configuring a particular circuit. Also, smooth mold material 518 covers the substrate extension portion 511T as with the above embodiments.

The holding member 520 has a panel supporting portion 521 and a thick extension facing portion 522, a recessed groove 521a is provided on the supporting portion 521 in the same manner as described above, and a storing recess 522a is provided on the extension facing portion 522 in the same manner as described above. With this holding member 522, shock-absorbing material 525 is inserted in between the liquid crystal panel 510 so as to wrap around the panel supporting portion 521 in the shape of a frame. This shock-absorbing material 525 is inserted between the liquid crystal panel 510 and the holding member 520 including the extension facing portion 522 in the assembled state shown in the figure, and is also disposed between the storing recess 522a and the liquid crystal driving IC 515 stored in the storing recess 522a. The holding member 520 is positioned in front of the liquid crystal panel 510 (toward the observation side thereof), such that the panel supporting member 521 functions as a window member for the display face of the liquid crystal panel 510 (as protective material for the display face).

The holding member 530 is positioned behind the liquid crystal panel 510 (the opposite side form the observation side), and as shown in FIG. 12, has an engaging portion 532 for engaging with the engaging portion 523 of the holding member 520. The holding member 520 and the holding member 530 hold the liquid crystal panel 510 therebetween, by the engaging of the engaging portion 523 and the engaging portion 532. The holding member 530 is configured to function as a light guide, and has at the edge thereof a light guiding recessed portion 530a formed as a notched opening having a half-circle planar shape.

The holding member 530 is positioned upon the circuit board 540, and a light-emitting element 541 such as an LED or the like is mounted on the circuit board 540. The light-emitting element 541 is arranged so as to be introduced into the light guiding recessed portion 530a formed on the edge of the holding member 530. Light emitted from the light-emitting element 541 is introduced into the holding member 530 from the light guiding recessed portion 530a, and emitted toward the liquid crystal driving area of the liquid crystal panel 510.

Figure 13:
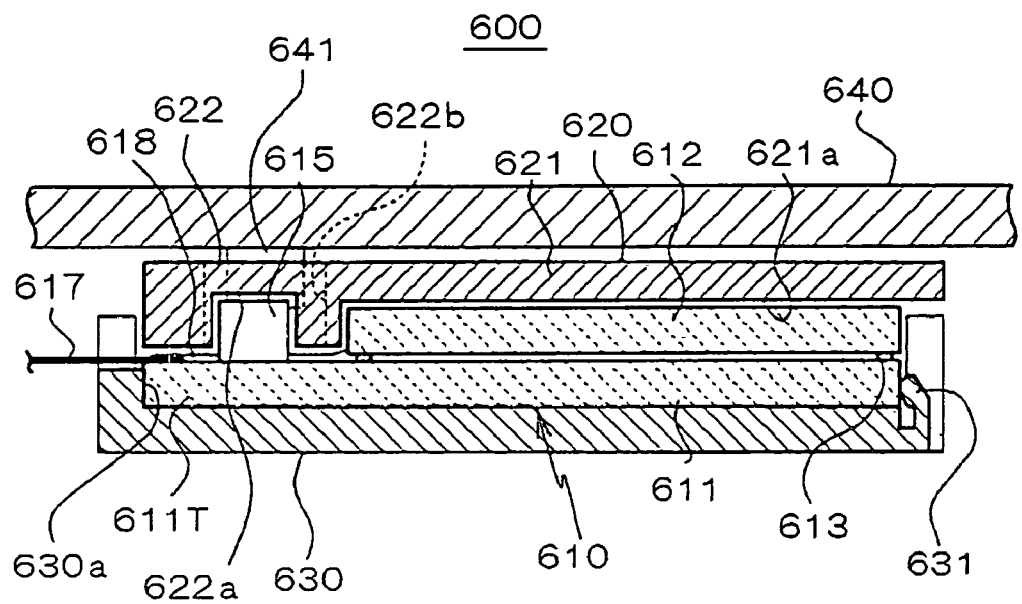
FIG. 13 is a longitudinal-sectional view illustrating the structure of the liquid crystal device according to a sixth embodiment of the present invention.
Figure 14:
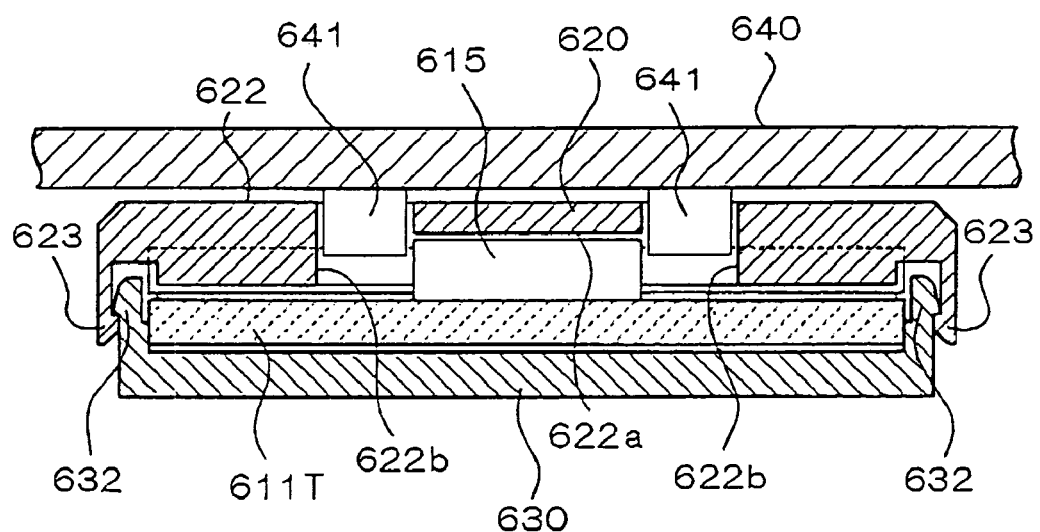
FIG. 14 is a longitudinal-sectional view illustrating the cross-section orthogonal to the cross-section shown in FIG. 13.

Next, the liquid crystal device 600 according to a sixth embodiment of the present invention will be described with reference to FIG. 13 and FIG. 14. FIG. 13 is a longitudinal-section view of the liquid crystal device 600, and FIG. 14 is a longitudinal-section view of a cross-section orthogonal to the cross-section of the liquid crystal device 600 shown in FIG. 13, cut so as to pass through the substrate extension portion 611T of the liquid crystal panel 610.

The liquid crystal device 600 has a liquid crystal panel 610 and holding members 620 and 630, as with the above embodiments. The liquid crystal panel 610 has the first substrate 611, the second substrate 612, the sealing material 613, the liquid crystal driving IC 615, and the wiring member 617, as with the above embodiments; description thereof will be omitted.

The holding member 620 has a panel supporting unit 621 and an extension facing portion 622 as with the above embodiments, and the recessed grove 621a is also configured in the same manner as described above. Also, a storing recess 622a for the liquid crystal driving IC 615 and a pair of storing openings 622b positioned adjacent thereto are formed on the extension facing portion 622. The storing openings 622b store light-emitting elements 641 mounted on the circuit board 640 and positioned so as to overlap with the holding material 620, and are configured such that the light-emitting elements 641 face the edge of the holding member 620 and light is introduced from this edge.

As with the fourth embodiment, the holding member 630 has an abutting portion 630a for abutting against the edge of the first substrate 611 of the liquid crystal panel 610 and an elastic engaging portion 631 formed on the opposite side of the abutting portion 630, and is configured so as to position and hold the liquid crystal panel 610 with this abutting portion 630a and elastic engaging portion 631.

Also, as with the fourth embodiment, the holding members 620 and 630 are configured to mutually engage with the engaging portion 623 and engaging portion 632, such that the engaging of the engaging portions holds the liquid crystal panel 610 therebetween.

With the liquid crystal device 600, the liquid crystal driving IC 615 is stored in the storing recess 622a of the holding member 620, and the light-emitting elements 641 mounted on the circuit board 640 are stored in the storing openings 622b formed on both the left and right sides of the storing recess 622a. In this example, the storing openings 622b formed on both sides of the storing recess 622a are configured so as to communicate, and the light-emitting elements 641 are positioned adjacently on either side of the liquid crystal driving IC 615 without the wall of the holding member 620 introduced therebetween. Such a configuration gives freedom in the relative positioning of the electronic parts of various types such as the liquid crystal driving IC 615 and light-emitting elements 641 and so forth, thus facilitating design, and also allowing the overall liquid crystal device 600 to be reduced in size.

Note that the present embodiment is configured such that the storing recess 622a is configured so as to accommodate the liquid crystal driving IC 615 from the liquid crystal panel 610 side, while storing openings 622b are formed so as to accommodate the light-emitting elements 641 from the circuit board 640 side, but an arrangement may be made wherein a storing recess is formed for accommodating the light-emitting elements 641 from the circuit board 640 side alone, instead of the storing openings 622b. Conversely, a storing opening may be provided instead for the storing recessed portion 622a. In the case of the latter, the storing portion for the liquid crystal driving IC 615 and the storing portion for the light-emitting elements 641 may be integrally configured. Such an arrangement places the pair of light-emitting elements 641 adjacent to the liquid crystal driving IC 615 on either side thereof, but even so, the point that positioning of the liquid crystal panel 610, holding member 620, and circuit board 630 is facilitated, is basically the same as the above embodiments.

Next, other configuration examples relating to the present invention will be described with reference to FIG. 15 through FIG. 21.

Figure 15:
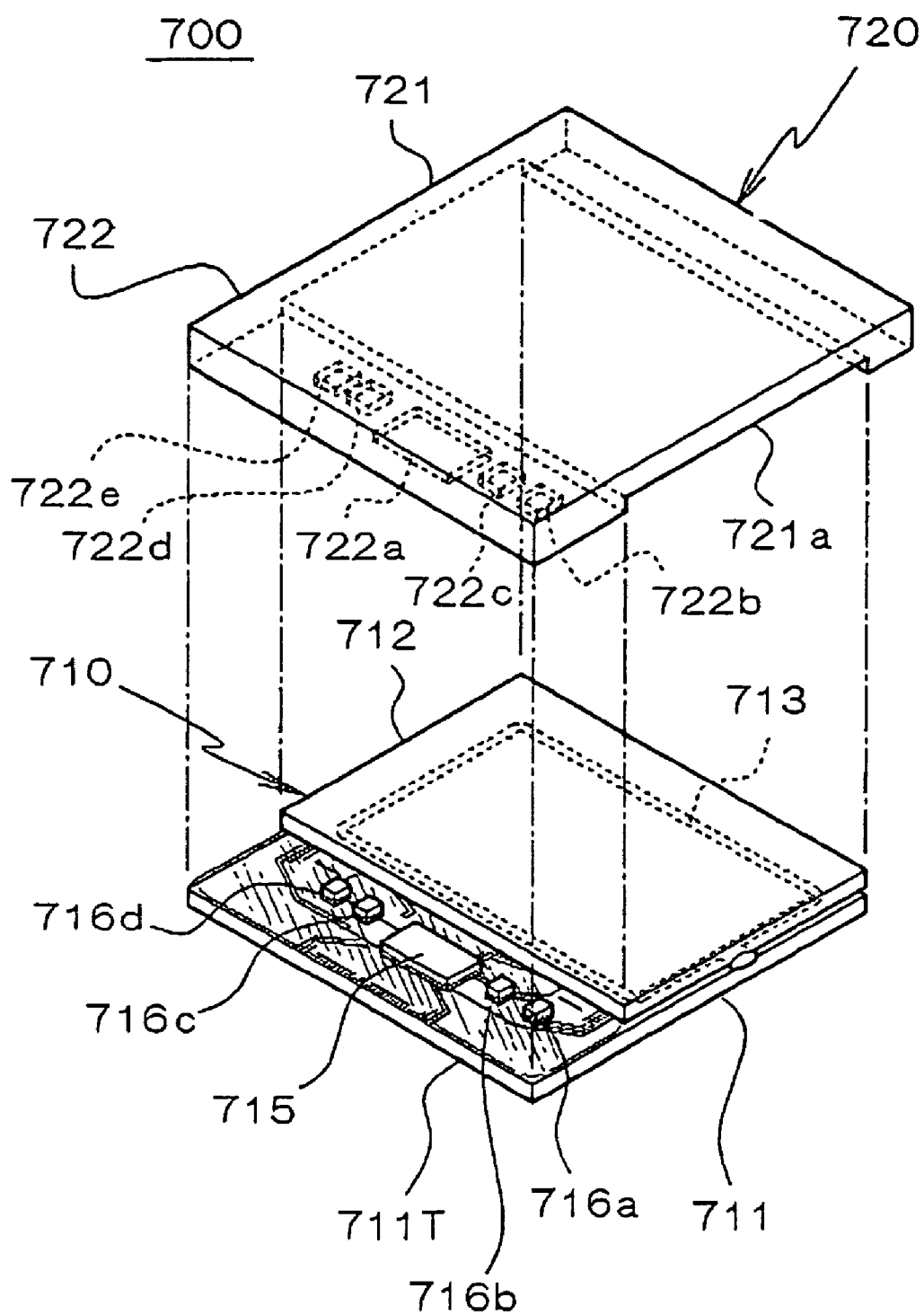
FIG. 15 is a disassembled perspective view illustrating the structure of the configuration example 1.

FIG. 15 is a disassembled perspective view illustrating the structure of the liquid crystal device 700 according to the present invention. The liquid crystal device 700 has a liquid crystal panel 710 and a holding member 720. The liquid crystal panel 710 has the first substrate 711, the second substrate 712, the sealing material 713, as with the above embodiments, and the liquid crystal driving IC 715 and multiple chip parts 716a through 716d are mounted on the substrate extension portion 711T thereof.

On the other hand, the panel supporting unit 721 and extension facing portion 722 are provided on the holding member 720, and the recessed grove 721a is also formed on the panel supporting unit 721 in the same manner as described with the above embodiments. Storing recesses 722a though 722d corresponding to the liquid crystal driving IC 715 and the chip parts 716a through 716e are formed in the thickly formed extension facing portion 722.

In this configuration example, multiple electronic parts having different shapes and dimensions, such as the liquid crystal driving IC 715 and the chip parts 716a through 716e, are mounted on the substrate extension portion 711T of the liquid crystal panel 710, and storing recesses 722a though 722d having different shapes and dimensions corresponding to the electronic parts are formed accordingly in the holding member 720. More specifically, storing recesses with deep or great planar shapes are formed corresponding to electronic parts having great protrusion amounts (height) or planar shapes, and storing recesses with small depth or planar shapes are formed corresponding to electronic parts having small protrusion amounts or planar shapes. Also, the storing recesses preferably have planar forms corresponding to the planar forms of the electronic parts (e.g., similar shapes).

Figure 16:
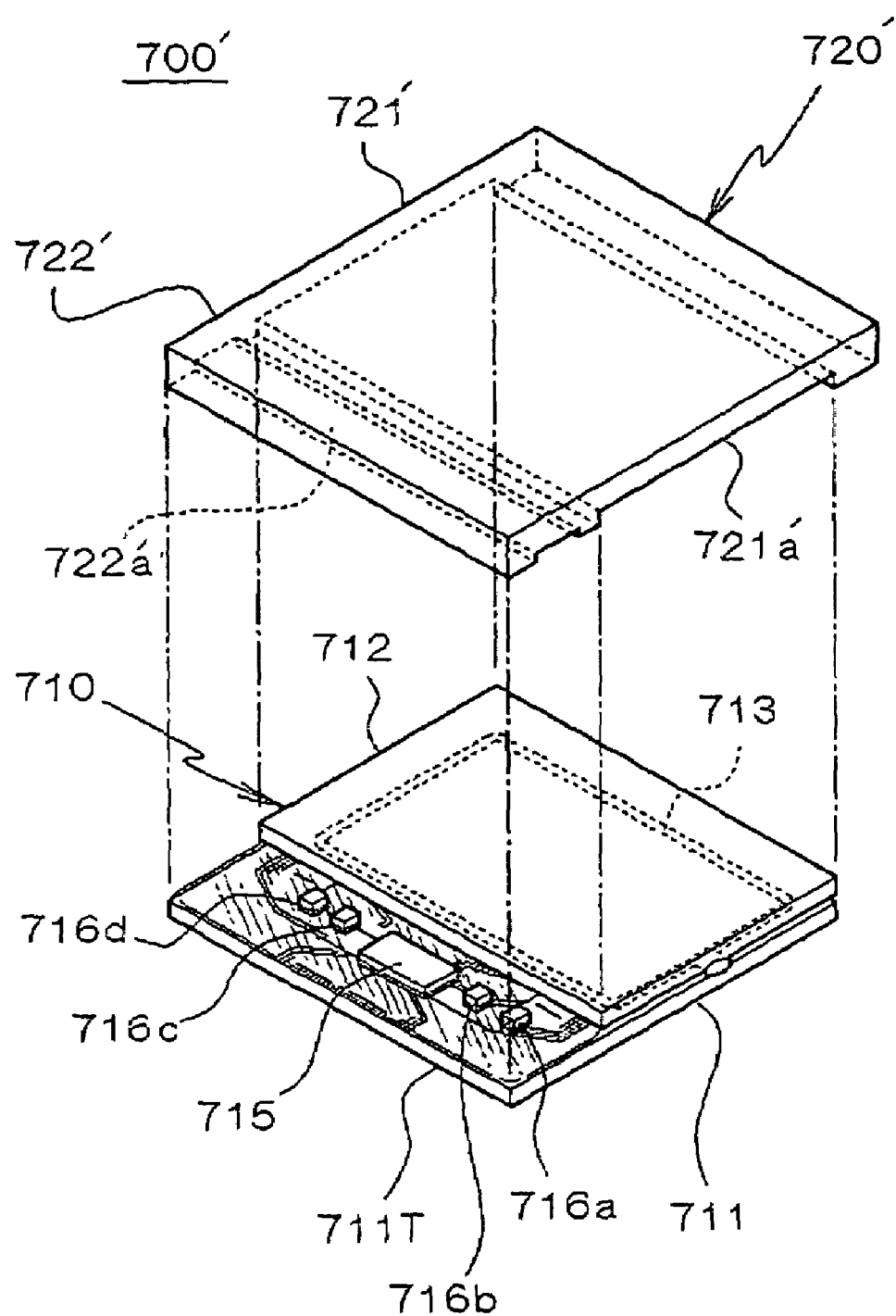
FIG. 16 is a disassembled perspective view illustrating the structure of the configuration example 2.

FIG. 16 is a disassembled perspective view illustrating the structure of the liquid crystal device 700' according to configuration example 2 of the present invention. The liquid crystal device 700' has a liquid crystal panel 710 exactly the same as that of the above configuration example 1, and the holding member 720' is positioned so as to overlay on the liquid crystal panel 710.

The holding member 720' has the panel supporting portion 721' comprising the recessed groove 721a' the same as the configuration example 1, but a storing groove 722a' different from that of configuration example 1 is formed to the extension facing portion 722'. The storing groove 722a' is formed along the entire width of the extension facing portion 722', so as to be able to store all of the liquid crystal driving IC 715 and multiple chip parts 716a through 716d mounted on the substrate extension portion 711T of the liquid crystal panel 710. In other words, the storing groove 722a is configured so as to be able to collectively store multiple different electronic parts therein.

Figure 17:
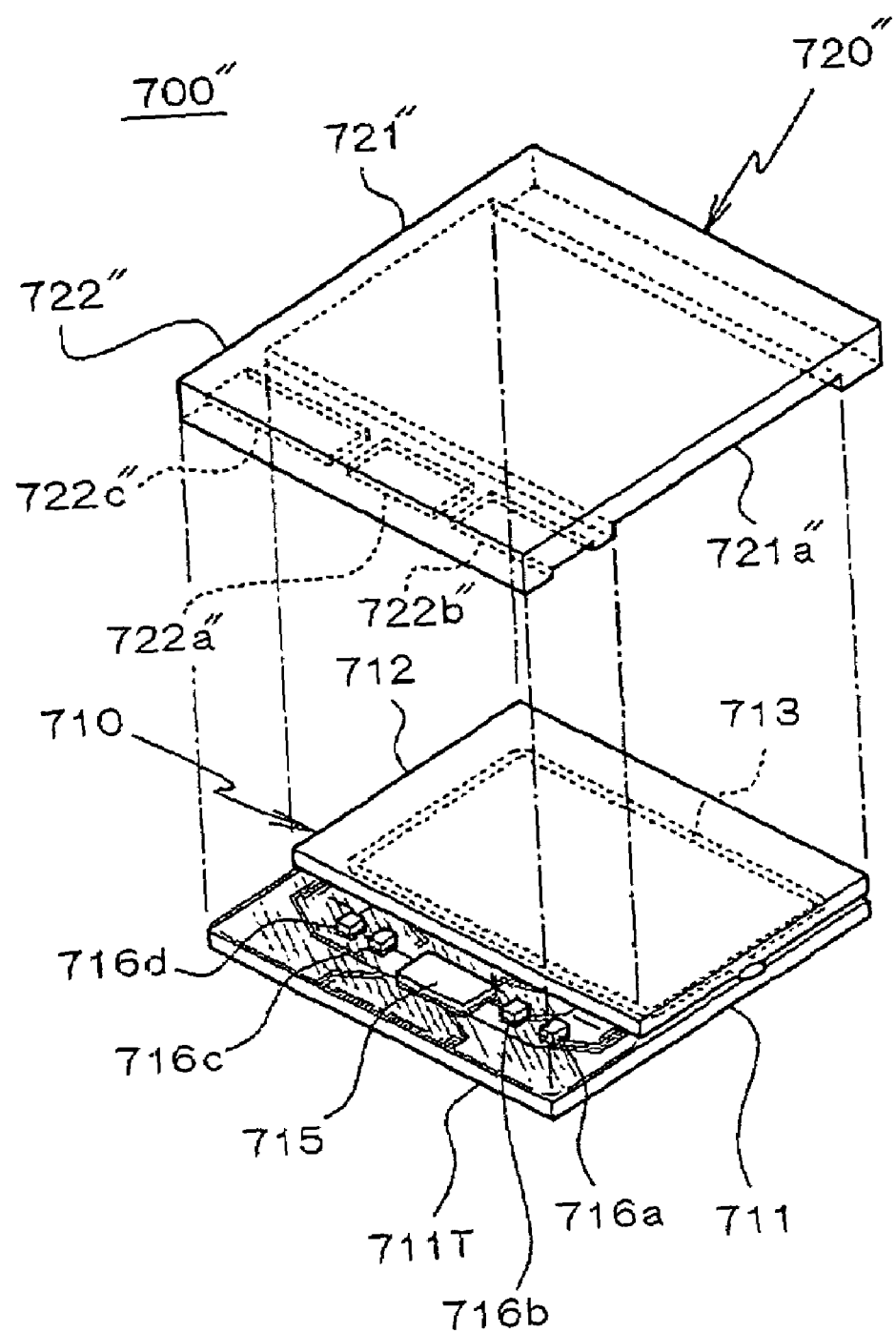
FIG. 17 is a disassembled perspective view illustrating the structure of the configuration example 3.

FIG. 17 is a disassembled perspective view illustrating the structure of the liquid crystal device 700" according to configuration example 3 of the present invention. The liquid crystal device 700" has a liquid crystal panel 710 exactly the same as that of the above configuration example 1 and configuration example 2, and the holding member 720" is positioned so as to overlay on the liquid crystal panel 710.

The holding member 720" has the panel supporting portion 721" comprising the recessed groove 721a" the same as the configuration example 1, but storing recesses 722a", 722b", and 722c" different from that of configuration example 1 are formed to the extension facing portion 722". The storing groove 722a" is formed so as to be able to store the liquid crystal driving IC 715 mounted on the substrate extension portion 711T of the liquid crystal panel 710, the storing recess 722b" is formed so as to be able to store the chip parts 716a and 716b, and the storing recess 722c" is formed so as to be able to store the chip parts 716c and 716d. In other words, the storing recesses 722b" and 722c" are configured so as to be able to store multiple electronic parts therein.

Figure 18:
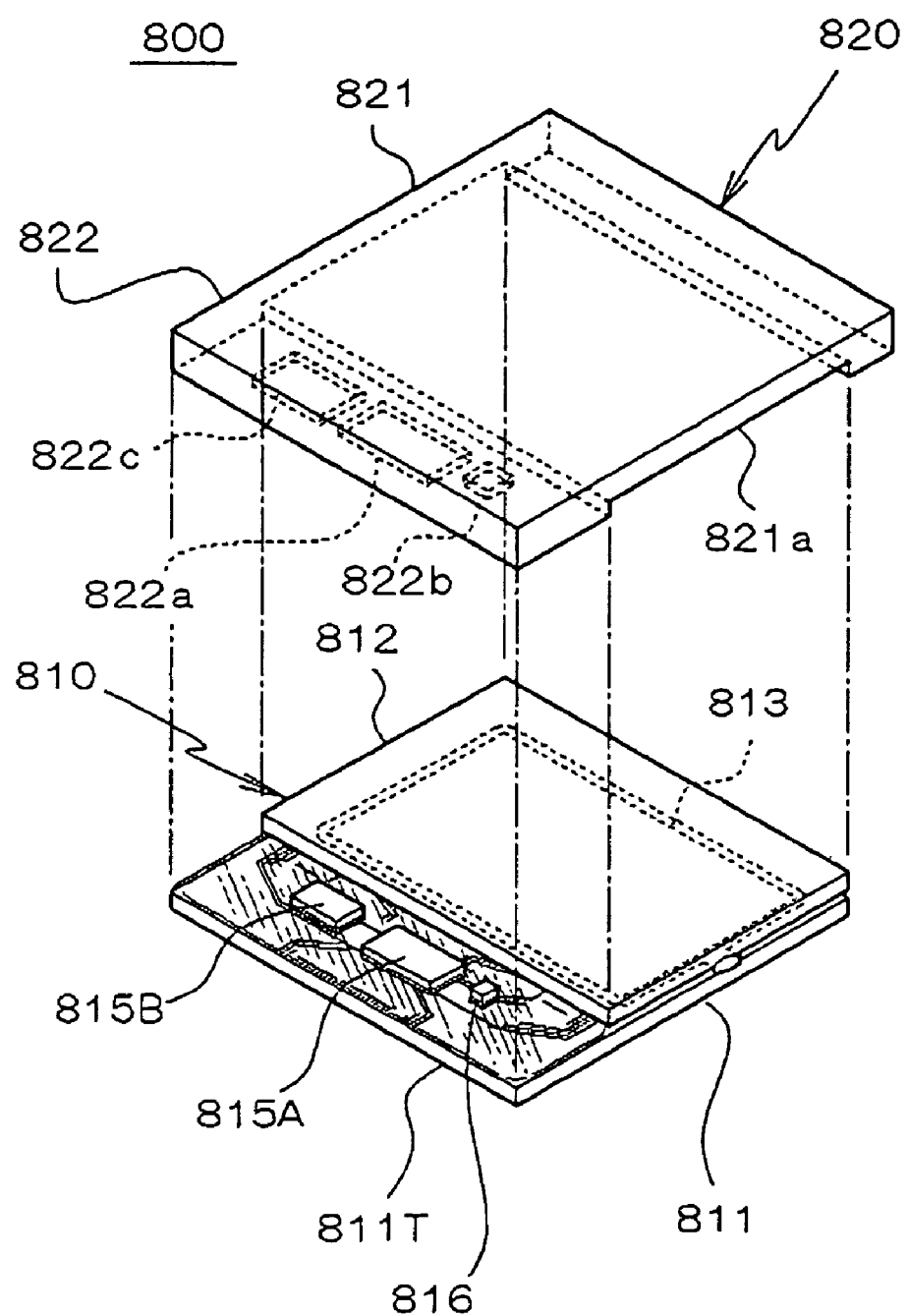
FIG. 18 is a disassembled perspective view illustrating the structure of the configuration example 4.

FIG. 18 is a disassembled perspective view illustrating the structure of the liquid crystal device 800 according to a fourth embodiment of the present invention. The liquid crystal device 800 has a liquid crystal panel 810 and a holding member 820. As described above, the liquid crystal panel 810 has the first substrate 811, the second substrate 812, and the sealing material 813, and two liquid crystal driving ICs 815A and 815B, and chip parts 816, are mounted on the substrate extension portion 811T.

On the other hand, the holding member 820 has the panel supporting unit 821 with the recessed grove 821a as described above and extension facing portion 822 having storing recesses 822a, 822b, and 822c. The storing recess 822a formed on the extension facing portion 822 is formed so as to be able to accommodate the liquid crystal driving IC 815A on the substrate extension portion 811T, the storing recess 822b is formed so as to be able to accommodate the chip parts 816, and the storing recess 822c is formed so as to be able to accommodate the other liquid crystal driving IC 815B.

With this configuration example 4, multiple liquid crystal driving ICs 815A and 815B are formed on the liquid crystal panel 810, and multiple storing recesses 822a and 822c corresponding to the liquid crystal driving ICs are formed accordingly in the holding member 820.

Also, in the event that multiple liquid crystal driving ICs are mounted as with this configuration example 4, a storing recess for storing the multiple liquid crystal driving ICs together may be provided as with the configuration example 2 and configuration example 3, or a storing recess or storing groove for storing all electronic parts may be provided.

Figure 19:
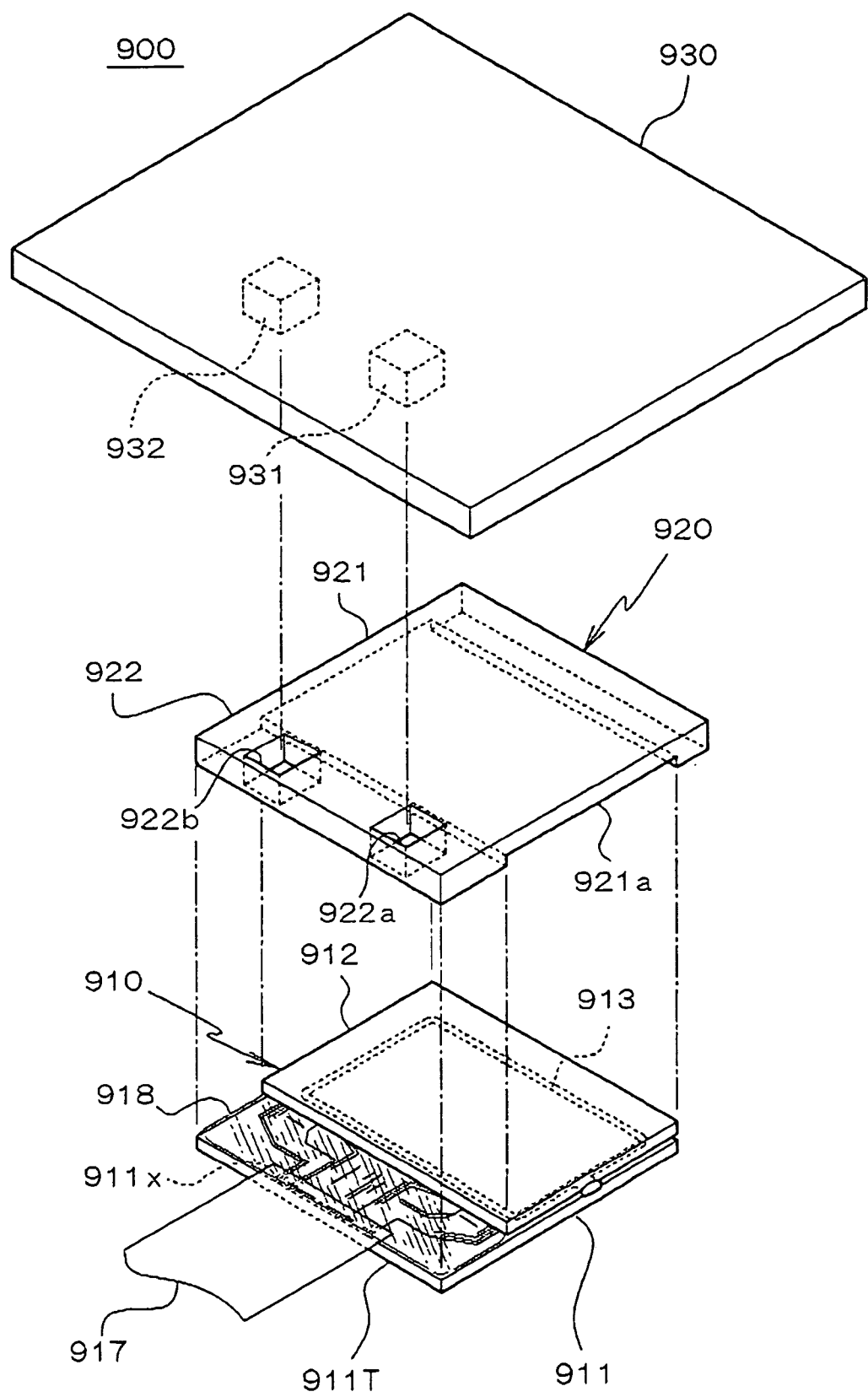
FIG. 19 is a disassembled perspective view illustrating the structure of the configuration example 5.

FIG. 19 is a disassembled perspective view illustrating the structure of the liquid crystal device 900 according to a fifth embodiment of the present invention. The liquid crystal device 900 has a liquid crystal panel 910 and a holding member 920. As described above, the liquid crystal panel 910 has the first substrate 911, the second substrate 912, and the seal material 913. The liquid crystal panel 910 does not have liquid crystal driving ICs or chip parts mounted on the substrate extension portion 911T; the wiring member 917 which is the same as that described above is directly mounted onto an input terminal array 911x formed on the substrate extension portion 911T. Mold material 918 is smoothly formed on the surface of the substrate extension portion 911T.

On the other hand, as described above, the holding member 920 has the panel supporting unit 921 with the recessed grove 921a and thick extension facing portion 922 having storing openings 922a and 922b. The storing openings 922a and 922b on the extension facing portion 922 are formed so as to be able to accommodate light-emitting elements 931 and 932 mounted on the circuit board 930.

With this configuration example 5, the light-emitting elements 931 and 932 are stored in the storing openings 922a and 922b of the holding member 920, and light emitted from the light-emitting elements 931 and 932 from the inner faces of the openings is introduced into the holding member 920.

Figure 20:
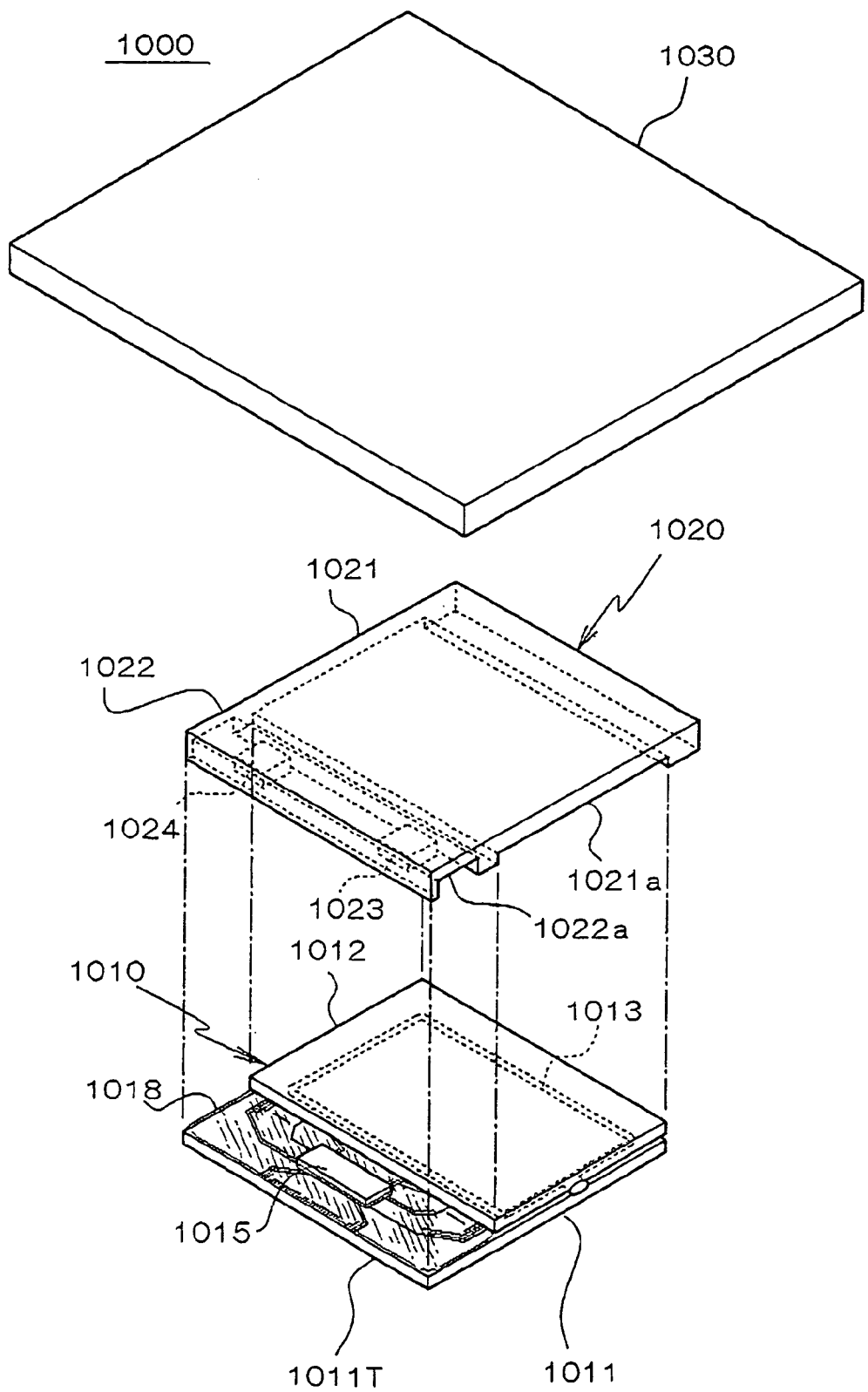
FIG. 20 is a disassembled perspective view illustrating the structure of the configuration example 6.

FIG. 20 is a disassembled perspective view illustrating the structure of the liquid crystal device 1000 according to the present invention. The liquid crystal device 1000 has a liquid crystal panel 1010 and a holding member 1020 positioned so as be overlaid thereupon. The liquid crystal panel 1010 is formed by attaching the first substrate 1011 and the second substrate 1012 one to another with the seal material 1013, and sealing liquid crystal therewithin. The liquid crystal driving IC 1015 is mounted on the substrate extension portion 1011T.

On the other hand, the holding member 1020 comprises a panel supporting portion 1021 with the same recessed groove 1021a as described above, and a substrate extension portion having a storing grove 1022a as with the above configuration example 2. A pair of light-emitting elements 1023 and 1024 are attached and fixed within the storing grove 1022a. The configuration is such that when the holding member 1020 is positioned in the proper position above the liquid crystal panel 1010, the light-emitting elements 1023 and 1024 are positioned on either side of the liquid crystal driving IC 1015 stored in the center storing grove 1022a. Incidentally, the light-emitting elements 1023 and 1024 attached to the holding member 1020 are electroconductively connected to the circuit board 1030 via, for example, unshown wiring.

With this configuration example 6, the pair of light-emitting elements 1023 and 1023 are attached within the storing grove 1022a formed in the holding member 1020, and the configuration is such that the storing grove 1022a between the light emitting elements 1023 serves as a storing recess for storing the liquid crystal driving IC 1015.

Figure 21:
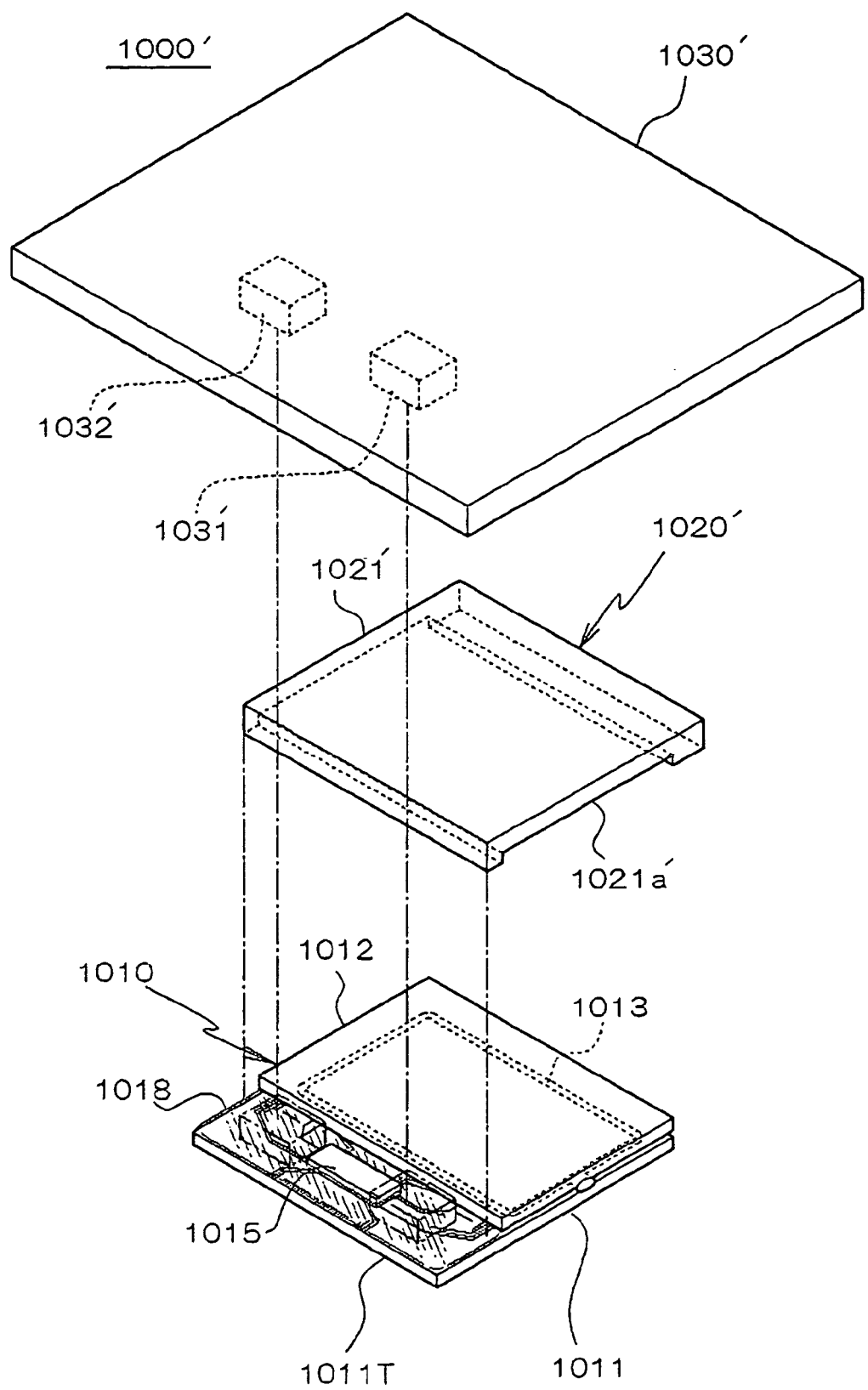
FIG. 21 is a disassembled perspective view illustrating the structure of the configuration example 7.

FIG. 21 is a disassembled perspective view illustrating the structure of the liquid crystal device 1000' according to the present invention. The liquid crystal device 1000' has a liquid crystal panel 1010, a holding member 1020', and a circuit board 1030'. The liquid crystal panel 1010 is the same as the liquid crystal panel in the above configuration example 6, so description thereof will be omitted.

The holding member 1020' comprises only the panel supporting portion 1021 with the same recessed grove 1021a' as above, and the configuration does not have the portion facing the substrate extension portion 1011T of the liquid crystal panel 1010. Also, the pair of light-emitting elements 1031' and 1032' are mounted on the lower surface of the circuit board 1030', as viewed in the figure.

In this configuration example 7, overlaying the liquid crystal panel 1010 and circuit board 1030' with the holding member 1020' introduced therebetween causes the light-emitting elements 1031' and 1032' mounted on the circuit board 1030' to be directly opposingly positioned on the substrate extension portion 1011T of the liquid crystal panel 1010 as indicated by the chain line in the figure. The configuration is such that, at this time, the light-emitting elements 1031' and 1032' are adjacently positioned on either side of the liquid crystal driving IC 1015 mounted on the substrate extension portion 1011T. Accordingly, the liquid crystal driving IC 1015 is positioned between the pair of light-emitting elements 1031' and 1032', so the liquid crystal driving IC and the light-emitting elements are not positioned overlapping in the thickness direction, thereby allowing the thickness of the liquid crystal device 1000' to be reduced, and also such an adjacent placement structure of electronic parts serves as a guide for assembly, facilitating positioning, and consequently the assembly work can be carried out in a sure and speedy manner.

Next, the method for forming mold material on the substrate extension portion of the liquid crystal panel in the above embodiments, variations, and configuration examples, will be described. The above-described smooth mold material here can be applied to any of the above embodiments, variations, and configuration examples, but here description will be made using the liquid crystal panel 210 according to the second embodiment as an example.

Figure 22:
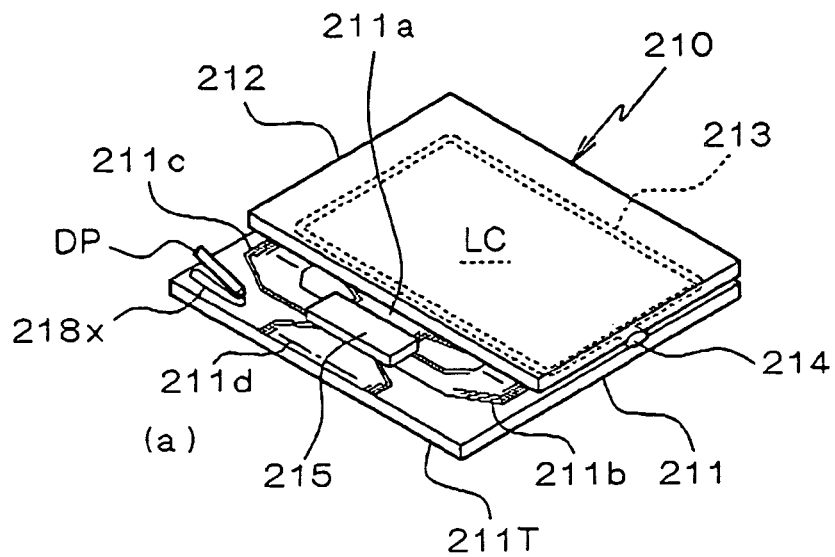
FIG. 22 is a process-describing diagram illustrating procedures for the mold method 1.
Figure 22:
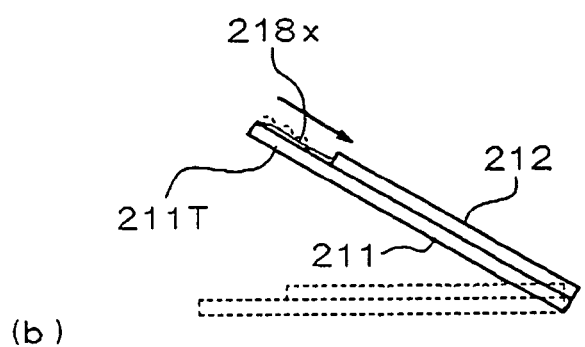
Figure 22:
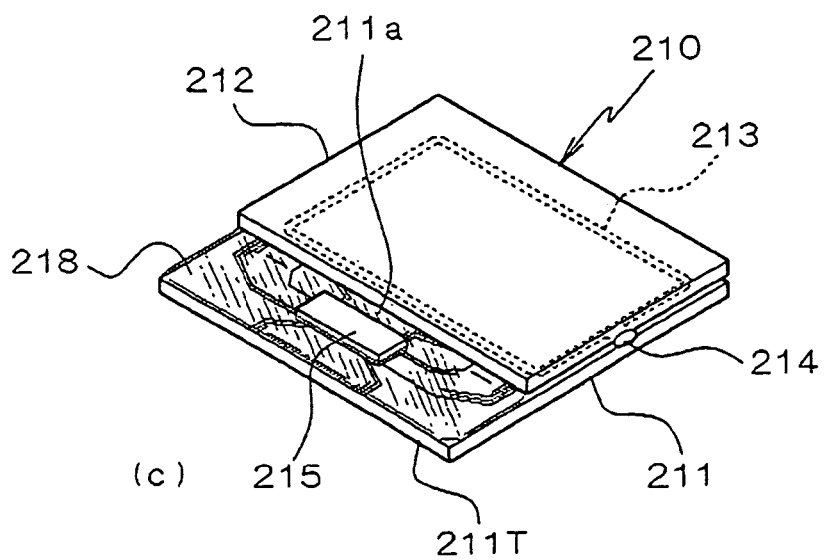

FIG. 22 is a process-describing diagram illustrating a method 1 for applying mold material suitable for the present invention (hereafter simply referred to as "mold method"). With this mold method, first, unhardened mold material 218x is applied to the surface of the substrate extension portion 211T of the liquid crystal panel 210 using a dispenser (syringe) DP, as shown in FIG. 22(a).

Mold material used here may include solvent type (room temperature hardening) mold material, ultraviolet-light hardening mold material, or the like. The viscosity of the mold material needs to be a relatively low viscosity in the unhardened state due to later-described reasons, and preferably is in a range of, for example, around 0.1 to 1.0 (Pa·s). If this range is exceeded, it becomes difficult to obtain a smooth laminated form due to insufficient fluidity of the unhardened mold material 118x, and under this range handling is difficult since it becomes difficult to hold onto the substrate extension portion 211T.

Next, as shown in FIG. 22(b), the entire liquid crystal panel 210 is inclined, causing the unhardened mold material 218x on the substrate extension portion 211T to flow along the surface of the substrate, thereby forming an approximately uniform thickness on the entire substrate extension portion 211T except for the mounting area of the liquid crystal driving IC 215.

At the point that the unhardened mold material 218x has spread approximately uniformly on the substrate extension portion 211T, the liquid crystal panel 210 is returned to the horizontal attitude as shown in FIG. 22(c), and in the event that room temperature hardening mold material is used the article is left standing, and in the event that ultraviolet-light hardening mold material is used ultraviolet-light is irradiated, and in the event that thermal-hardening mold material is used heat is applied, thereby hardening the unhardened mold material 218x and forming the hardened mold material 218.

Figure 23:
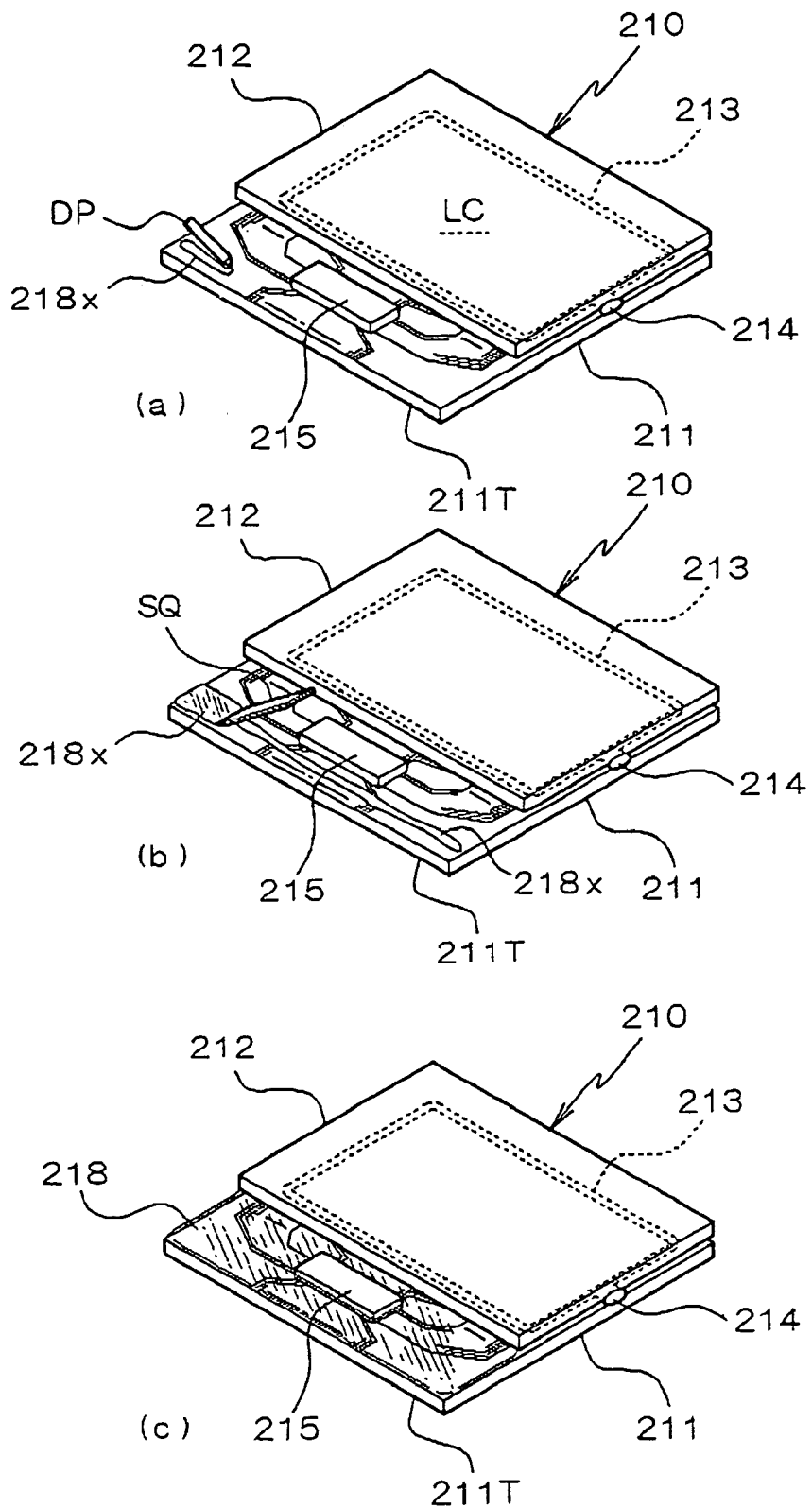
FIG. 23 is a process-describing diagram illustrating procedures for the mold method 2.

FIG. 23 is a process-describing diagram illustrating a mold method 2 applicable to the present invention. With this mold method, following applying unhardened mold material 218x to the surface of the substrate extension portion 211T using a dispenser DP or the like as with mold method 1 as shown in FIG. 23(a), the mold material 218x is smoothed with a squeegee SQ, as shown in FIG. 23(b) (smoothing with squeegee). Subsequently, hardening the unhardened mold material 218x as with mold method 1 yields a mold material 218 having a smooth surface on the substrate extension portion 211T, as shown in FIG. 23(c).

Now, the above mold methods 1 and 2 consist of placing unhardened mold material 118x on the substrate of a liquid crystal panel, following which the unhardened mold material 118 is caused to flow on the substrate so as to smooth the mold material, and methods may be used other than the above methods of inclining the liquid crystal panel of mechanically spreading using a squeegee, such as methods smoothing the unhardened mold material using air flow, or the like.

Figure 24:
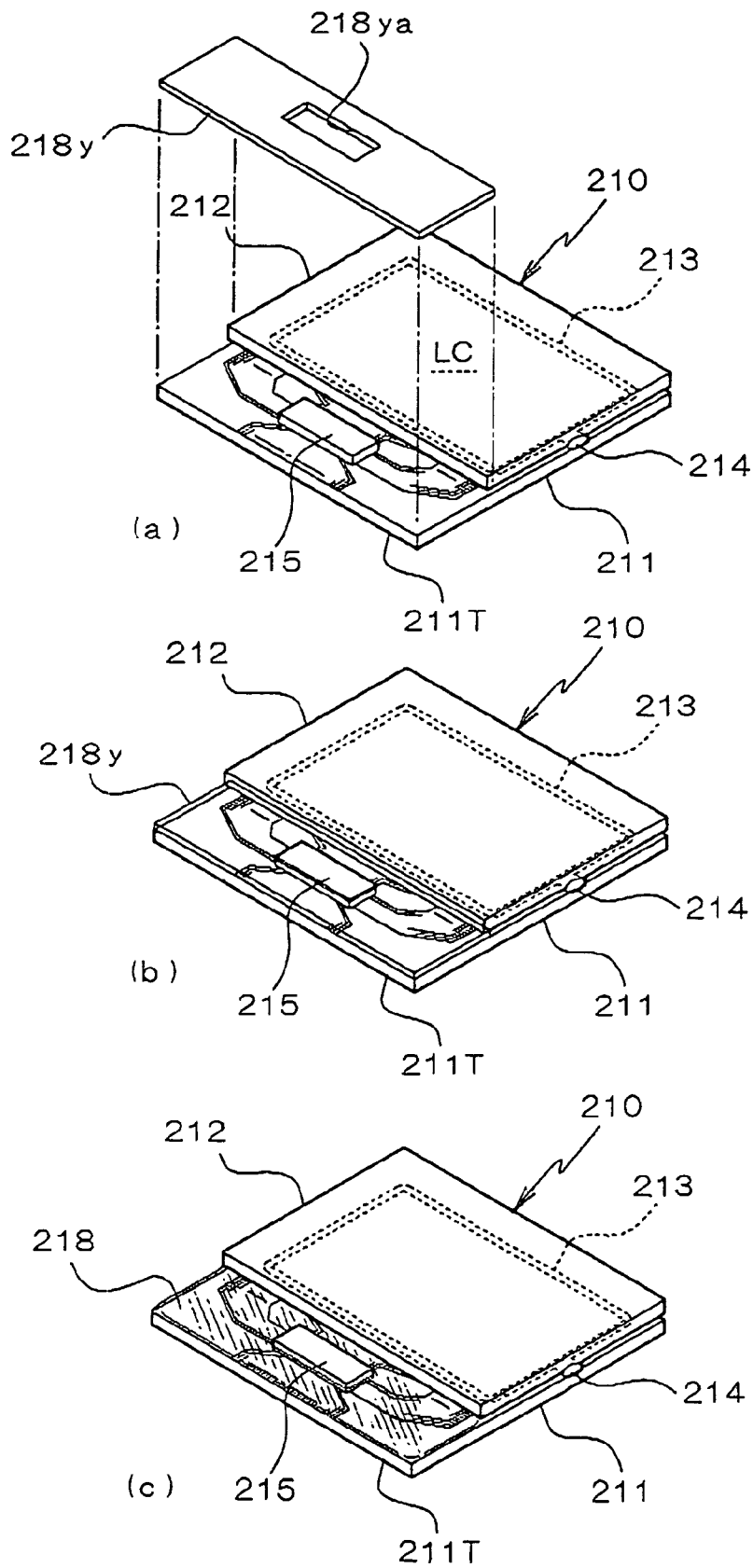
FIG. 24 is a process-describing diagram illustrating procedures for the mold method 3.

FIG. 24 is a process-describing diagram illustrating a mold method 3 applicable to the present invention. With this mold method, as shown in FIG. 24(a), a mold sheet 218y, having a planar form approximately equal to that of the substrate extension portion 211T of the liquid crystal panel 210 and having an opening 218ya of a position and planar form approximately equal to that of the liquid crystal driving IC 215 mounted on the substrate extension portion 211T, is used.

The mold sheet 218y, following being laid on the substrate extension portion 211T as shown in FIG. 24(b), is softened by heating processing or the like, and fused onto the substrate extension portion 211T, thereby becoming a mold material 218 having a smooth surface on the substrate extension portion 211T, as shown in FIG. 24(c), thus covering the substrate.

Figure 25:
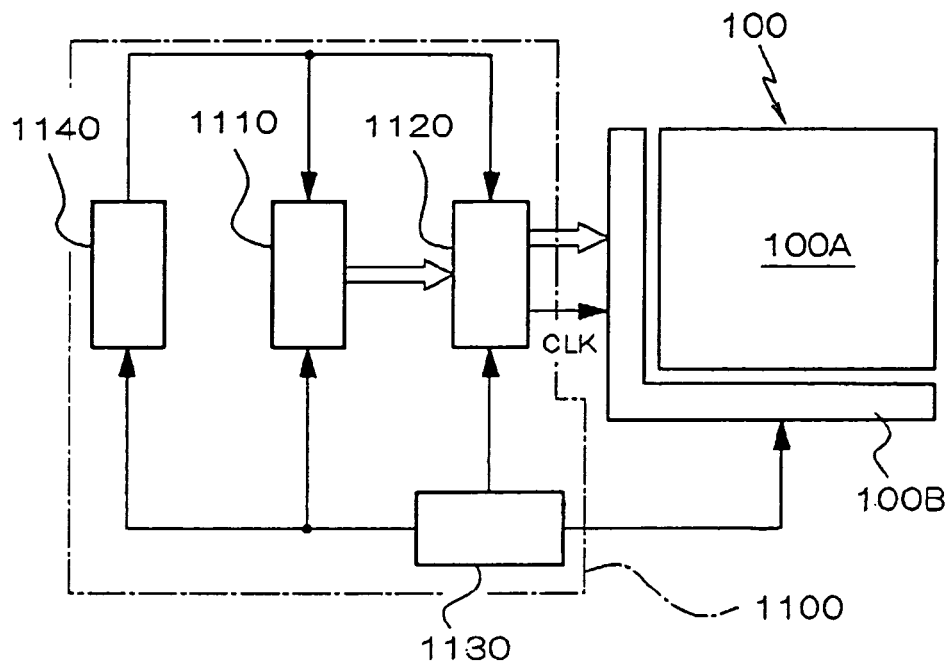
FIG. 25 is a schematic configuration diagram illustrating the circuit configuration of the electronic equipment according to the present embodiment.

Finally, description will be made regarding an embodiment of electronic equipment using the above liquid crystal device, with reference to FIG. 25 and FIG. 26. FIG. 25 is a schematic configuration diagram illustrating the configuration of the display system of the present embodiment. The electronic equipment illustrated here comprises the liquid crystal device illustrated in the above embodiments, variations, and configuration examples (representatively listed as liquid crystal device 100 in the figure), and a display control circuit 1100 for controlling this liquid crystal device as a display member.

The liquid crystal device 100 is configured of a panel member 100A including a liquid crystal panel and polarizing plates, back-lights, etc., that go with the liquid crystal panel, and a driving circuit 100B for driving the liquid crystal panel. The driving circuit 100B is configured of the liquid crystal driving IC mounted on the liquid crystal panel in the above embodiments, variations, and configuration examples.

The display control circuit 1100 comprises a display information output source 1110, a display processing circuit 1120, an electric power source circuit 1130, and a timing generator 1140.

The display information output source 1110 comprises memory such as ROM (Read Only Memory) and RAM (Random Access Memory) and the like, a storage unit of a magnetic recording disk or optical recording disk or the like, and a synchronizing circuit for performing synchronous output of digital image signals, and is configured so as to supply display information to a display information processing circuit 72 in the form of image signals or the like of a predetermined format, based on clock signals of various types generated by the timing generator 1140.

The display information processing circuit 1120 comprises various known circuits such as a serial/parallel conversion circuit, amplifying/inverting circuit, rotation circuit gamma correction circuit, clamp circuit etc., and executes processing of input display information and supplies the image information to the driving circuit 100B along with clock signals CLK. The driving circuit 100B includes a scanning line driving circuit, data line driving circuit, and detecting circuit. Also, the electric power source circuit 1130 supplies predetermined voltage to the respective components described above.

Figure 26:
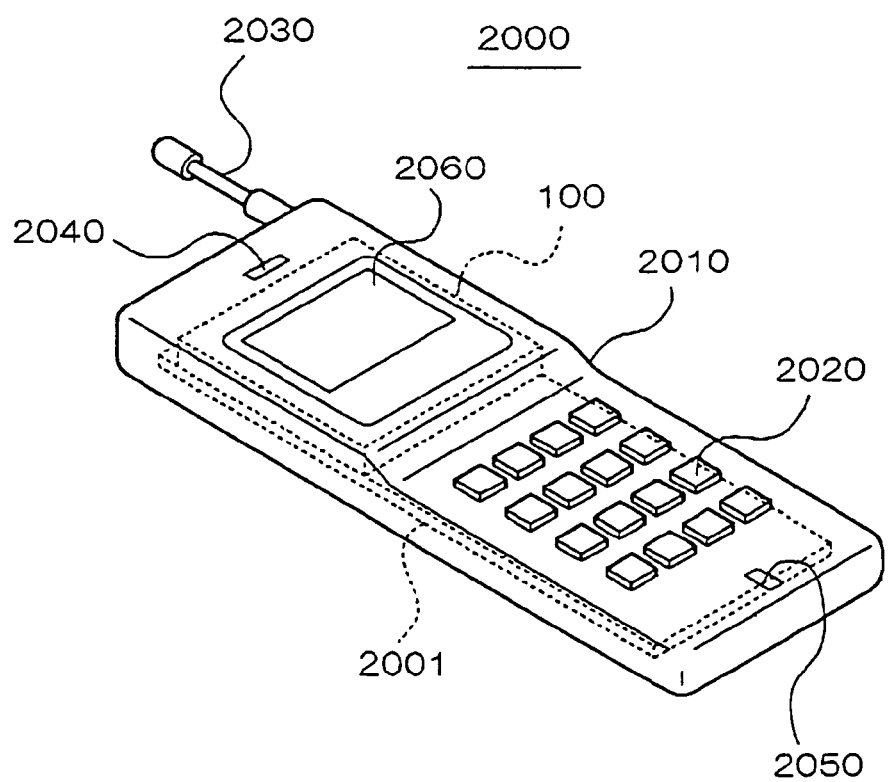
FIG. 26 is a schematic configuration diagram illustrating an external view of a cellular telephone as an example of the electronic equipment.

FIG. 26 illustrates a cellular telephone which is an embodiment of the electronic equipment relating to the present embodiment. This cellular telephone 2000 has a circuit board 2001 placed within a case unit 2010, and a liquid crystal display device comprising the above panel member 100A and driving circuit 100B is mounted on the circuit board 2001. Operating buttons 2020 are arrayed on the front face of the case unit 2010, and also an antenna 2030 is attached in an extractable manner to one end thereof. A speaker is positioned within an earpiece 2040, and a microphone is embedded in a mouthpiece 2050.

The panel member 100A positioned within the case unit 2010 is configured such that the display screen (the liquid crystal driving area formed within the above seal material) can be viewed through a display window 2060.

Note that the an electro-optical device, the method for manufacturing the electro-optical device, the light guide, the liquid crystal device, the method for manufacturing the liquid crystal device, and the electronic equipment, according to the present invention, are not restricted to the above-described examples shown in the figures, and it is needless to say that various modifications can be made without departing from the spirit and scope of the present invention. For example, the present invention is not restricted to the above-described transmitting liquid crystal device for the configuration of the liquid crystal device, and application can be made in the same manner to reflecting liquid crystal devices and semi-transmitting liquid crystal devices. Also, this is not restricted to dot-matrix type liquid crystal devices, and wide application of various types of liquid crystal devices can be made, such as segment type liquid crystal devices and so forth.

Also, the above descriptions have all been regarding cases of configuring liquid crystal devices, but the present invention can be similarly applied to various types of electro-optical devices having at least one electro-optical panel substrate, such as electroluminescence devices, organic electroluminescence devices, plasma display devices, and so forth.

According to the present invention as described above, the thickness and weight of electro-optical devices can be reduced, greatly contributing to reduction in the thickness and weight of various types of electronic equipment.

What is claimed is:

1. An electro-optical device, comprising:
a first electro-optical panel substrate;
a second electro-optical panel substrate opposing said first substrate;
a substrate extension portion provided on said first substrate and extending beyond said second substrate;
an electronic part mounted on said substrate extension portion; and
a holding member disposed along said second electro-optical panel substrate so as to cover said second electro-optical panel substrate;
wherein said electronic part is positioned so as to protrude from said first electro-optical panel substrate; and
wherein said holding member is provided with a storing portion for storing said electronic part, said storing portion surrounding said electronic part; and
wherein the holding member is provided with a storing portion for storing another electronic part at an area adjacent to the electronic part.

2. An electro-optical device, comprising:
a first electro-optical panel substrate;
a second electro-optical panel substrate;
an electronic part mounted on said first electro-optical panel substrate;
a first holding member disposed along said first electro-optical panel substrate so as to cover said first electro-optical panel substrate; and
a second holding member disposed along said second electro-optical panel substrate so as to cover said second electro-optical panel substrate;
wherein said electronic part is positioned so as to protrude from said first electro-optical panel substrate;
wherein said first holding member is provided with an abutting portion which abuts said first electro-optical panel substrate for positioning;
wherein said second holding member includes a storing portion for storing said electronic part; and
wherein at least one of said first holding member and said second holding member is configured so as to function as a light guide.

3. An electro-optical device according to claim 2, wherein said first holding member comprises an elastic holding portion for holding said first electro-optical panel substrate in a state abutted against said abutting portion.

4. An electro-optical device according to claim 2, wherein said first holding member is provided with a recessed structure containing said abutting portion for storing said electro-optical panel substrate.

5. An electro-optical device, comprising:
an electro-optical panel substrate;
an electronic part mounted on said electro-optical panel substrate; and
a holding member disposed along said electro-optical panel substrate so as to cover said electro-optical panel substrate;
wherein a plurality of said electronic parts are mounted on said electro-optical panel substrate;
wherein said plurality of electronic parts are positioned so as to protrude from said electro-optical panel substrate;
wherein said holding member is provided with a storing portion for storing said plurality of electronic parts; and
wherein said holding member is configured to function as a light guide.

6. An electro-optical device as claimed in claim 1, wherein the holding member is provided with the other electronic part as attached to the storing portion.

7. An electro-optical device as claimed in claim 1, wherein the holding member is a circuit board.

8. An electro-optical device as claimed in claim 7, wherein the holding member is positioned between the electro-optical panel substrate and the circuit board, the holding member including a storing portion that stores the electronic component and the other electronic component adjacent thereto.

9. An electro-optical device as claimed in claim 7, wherein the holding member has a light-guiding function.

10. An electro-optical device as claimed in claim 9, wherein the other electronic component is a light source.

11. An electro-optical device as claimed in claim 7, wherein one of the electronic part and the other electronic part is positioned between a pair of the other.

12. An electro-optical device as claimed in claim 1, wherein the electronic part is an electro-optical panel driving IC and the holding member has a notch provided from the outside at an area where said electro-optical panel driving IC is not situated.

13. An electro-optical device as claimed in claim 12, wherein holding member functions as a light guide.

14. An electro-optical device as claimed in claim 12, wherein a light source is stored in the notch.

15. An electro-optical device as claimed in claim 1, wherein the electronic part is an electro-optical panel driving IC and the holding member has a hole provided at an area where said electro-optical panel driving IC is not situated.

16. An electro-optical device according to claim 1, wherein said holding member is configured so as to function as a light guide.

17. An electro-optical device, comprising:

a first electro-optical panel substrate;

a second electro-optical panel substrate opposing said first substrate;

a substrate extension portion provided on said first substrate and extending beyond said second substrate;

an electronic part mounted on said substrate extension portion; and a holding member disposed along said second electro-optical panel substrate so as to cover said second electro-optical panel substrate;

wherein said electronic part is positioned so as to protrude from said first electro-optical panel substrate;

wherein said holding member is provided with a storing portion for storing said electronic part, said storing portion surrounding said electronic part;

wherein the electronic part is an electro-optical panel driving IC and the holding member has a notch provided from the outside at an area where said electro-optical panel driving IC is not situated; and wherein a light source is stored in the notch.

* * * * *